(12) United States Patent
Wheeler et al.

(10) Patent No.: US 6,618,727 B1
(45) Date of Patent: Sep. 9, 2003

(54) SYSTEM AND METHOD FOR PERFORMING SIMILARITY SEARCHING

(75) Inventors: David B. Wheeler, Austin, TX (US); Matthew J. Clay, Austin, TX (US)

(73) Assignee: Infoglide Corporation, Austin, TX (US)

(*) Notice: Subject to any disclaimer, the term of this patent is extended or adjusted under 35 U.S.C. 154(b) by 0 days.

(21) Appl. No.: 09/401,101

(22) Filed: Sep. 22, 1999

(51) Int. Cl.[7] .............................................. G06F 17/30
(52) U.S. Cl. ...................................... 707/10; 707/104.1
(58) Field of Search ........................ 707/1, 100, 104.1, 707/9–10

(56) References Cited

U.S. PATENT DOCUMENTS

| | | | |
|---|---|---|---|
| 5,666,442 A | 9/1997 | Wheeler | 382/209 |
| 5,799,301 A | * 8/1998 | Castelli et al. | 707/6 |
| 5,875,446 A | 2/1999 | Brown et al. | 707/3 |
| 6,236,988 B1 | * 5/2001 | Aldred | 707/3 |

OTHER PUBLICATIONS

Zbigniew R. Struzik and Arno Siebes, Wavelet Transform in Similarly Paradigm I, Jan 31, 1998, pp. 1–23.
Jonathan Robie, The Design of XQL, pp. 1–21.
Rakesh Agrawal, Christos Faloutsos and Arun Swami, Efficient Similarity Search In Sequence Databases, pp. 1–25.
Roger Weber and Stephen Blott, An Approximation–Based Data Structure for Similarity Search, pp. 1–27.
IBM Tutorial, pp. 1–10.

* cited by examiner

*Primary Examiner*—Kim Vu
*Assistant Examiner*—Jean Bolte Fleurantin
(74) *Attorney, Agent, or Firm*—Taylor Russell & Russell, P.C.

(57) ABSTRACT

The present invention is a computer-implemented method for detecting and scoring similarities between documents in a source database and a search criteria. It uses a hierarchy of parent and child categories to be searched, linking each child category with its parent category. Source database documents are converted into hierarchical database documents having parent and child objects with data values organized using the hierarchy of parent and child categories to be searched. For each child object, a child object score is calculated that is a quantitative measurement of the similarity between the hierarchical database documents and the search criteria. A parent object score is computed from its child object scores using an algorithm.

93 Claims, 35 Drawing Sheets

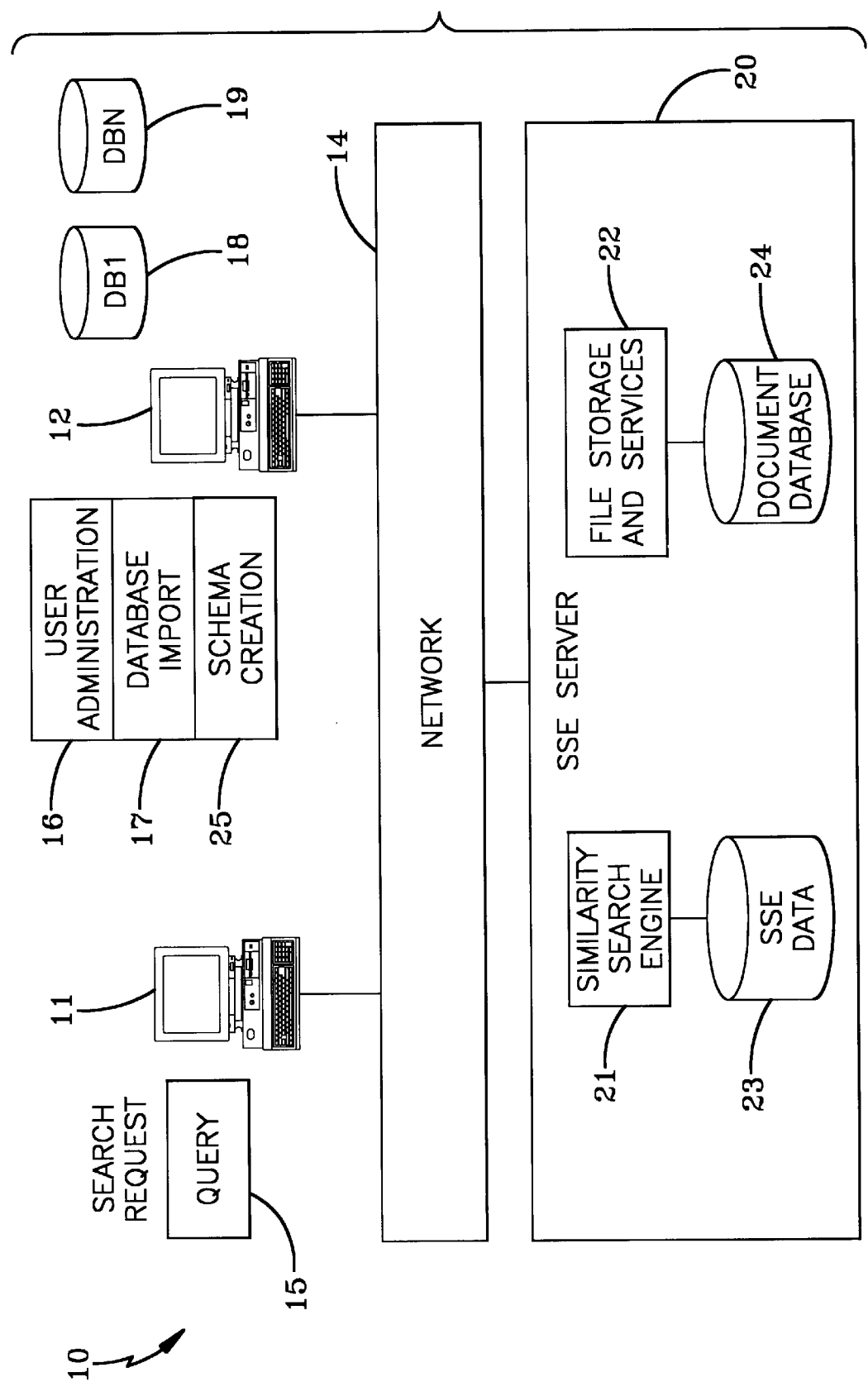

FIG-2

| Database Editor (Known Offenders) | | Properties | Import Maps | Diagnostics |
|---|---|---|---|---|
| Known Offenders | | ⊟Display Settings | | |
| Primary Key | | Color (Background) | ☐ White | |
| ⊟Person | | Color (Text) | ■ Black | |
| ⊟Name | | Visible | ☑ | |
| Honorarium | | ⊟General Settings | | |
| First | | Allow multiple | ☐ | |
| Middle | | Author | ☐ | |
| Last | | Collapse | | |
| Suffix | | Data type | Schema (SCHEMA) | |
| ⊟Address | | Description | Known Offenders | |
| Street | | Field name | KNOWN_OFFENDERS | |
| City | | ⊟SSE Settings | | |
| Sate | | Default rollup style | Sum | |
| Zip | | Default weight | 0% | |
| ⊟Description | | | | |
| Eye Color | | | | |
| Hair Color | | | | |
| ⊟Relative(s) | | | | |
| ⊟Name | | | | |
| First | | | | |
| Middle | | | | |
| Last | | | | |

26

| Document Editor (Known Offenders) | | |
|---|---|---|
| Question | 🔑 | Answer |
| ⊟ Known Offenders | | |
| Primary Key | | |
| ⊟ Person | | |
| Name | | |
| Honorarium | | Mr. |
| First | | John |
| Middle | | Q. |
| Last | | Public |
| Suffix | | |
| ⊟ Address | | |
| Street | | 123 Main St. |
| City | | Anytown |
| State | | Texas |
| Zip | | 12345-6678 |
| ⊟ Description | | |
| Eye Color | | Brown |
| Hair Color | | Brown |

FIG-3

Document Query (Untitled)

Query | Output | Filter

| Question | Search Value | | Measure | | Weight |
|---|---|---|---|---|---|
| ☐ Known Offenders | | | | ☐ | 0% |
| Primary Key | | | String Difference | ▷ | 100% |
| ☐ Person | | | | | 100% |
| ☐ Name | | | String Difference | ▷ | 0% |
| Honorarium | | | String Difference | ▷ | 0% |
| First | John | | Name | ▷ | 30% |
| Middle | | | Name | ▷ | 10% |
| Last | Public | | Name | ▷ | 60% |
| Suffix | | | String Difference | ▷ | 0% |
| ☐ Address | | | | | 100% |
| Street | 123 Main St. | | Street Address | ▷ | 30% |
| City | | | Name | ▷ | 30% |
| State | | ⋯ | State | ▷ | 20% |
| Zip | | | String Difference | ▷ | 20% |
| ☐ Description | | | | | 100% |
| Eye Color | | ⋯ | Exact | ▷ | 100% |
| Hair Color | | ⋯ | Exact | ▷ | 100% |

FIG–4A

| Document Query (Untitled) | | |
|---|---|---|
| Query | Output | Filter |

| Order | △ | Question |
|---|---|---|
| 1 | ☒ | \Known Offenders\Primary Key |
| 2 | ☐ | \Known Offenders\Person\Name\Honorarium |
| 3 | ☒ | \Known Offenders\Person\Name\First |
| 4 | ☐ | \Known Offenders\Person\Name\Middle |
| 5 | ☒ | \Known Offenders\Person\Name\Last |
| 6 | ☐ | \Known Offenders\Person\Name\Suffix |
| 7 | ☐ | \Known Offenders\Person\Address\Street |
| 8 | ☒ | \Known Offenders\Person\Address\City |
| 9 | ☐ | \Known Offenders\Person\Address\State |
| 10 | ☐ | \Known Offenders\Person\Address\Zip |
| 11 | ☐ | \Known Offenders\Person\Description\Eye Color |
| 12 | ☐ | \Known Offenders\Person\Description\Hair Color |

FIG — 4B

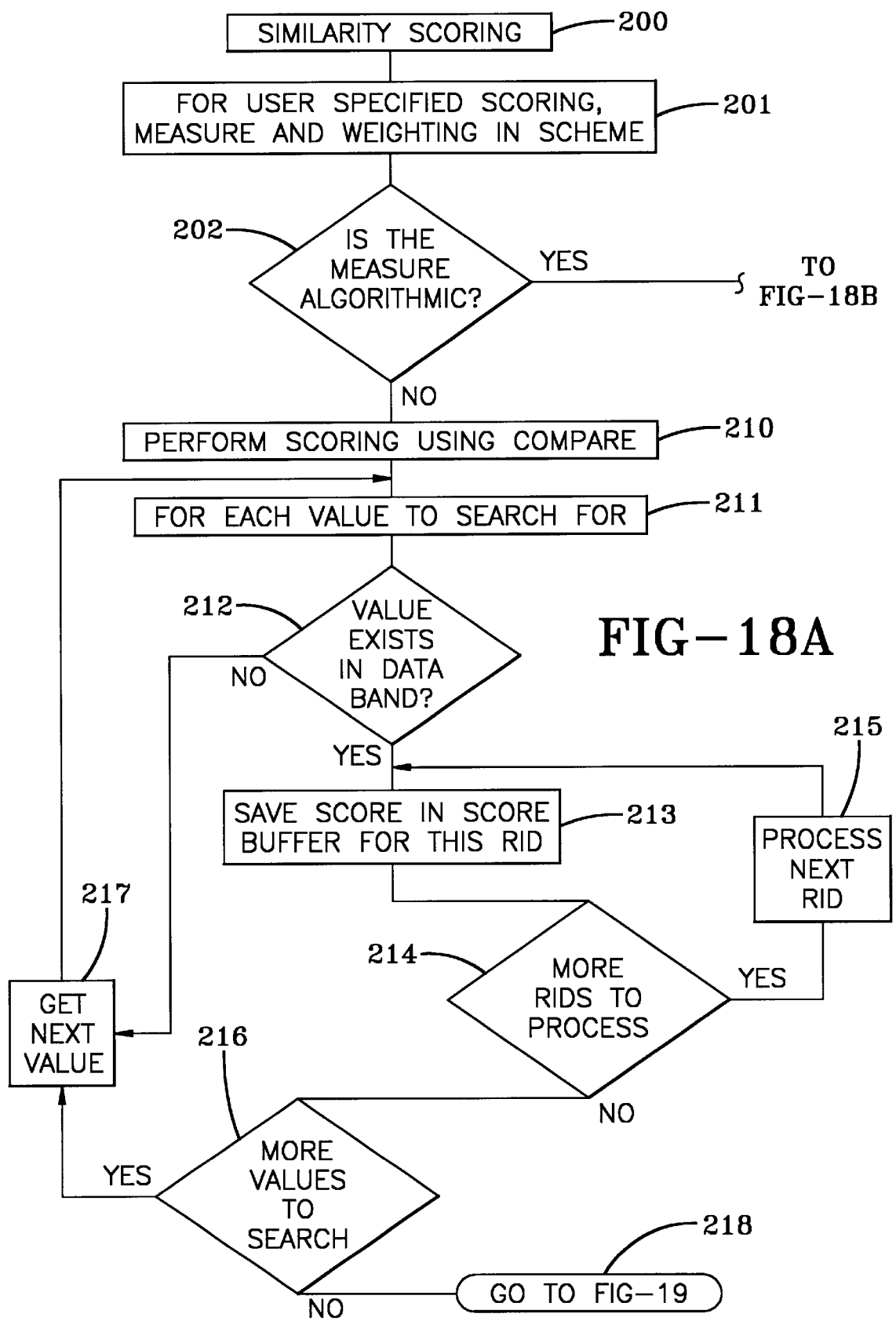

DATABASE

| RID | RID | | RID |
|---|---|---|---|
| INCIDENT ① | SUSPECT ① | HEIGHT: 6'-0" | ① |
| | | WEIGHT: 200 | ① |
| | | HAIR COLOR: BROWN | ① |
| | VICTIM | NAME: JOHN JONES | |
| | | ADDRESS: 123 MAIN ST. | |
| | CRIME | DATE: 1/1/99 | |
| | | LOCATION: ALLEY | |
| | | TYPE: ROBBERY | |
| | | DESCRIPTION: VICTIM WAS EMPTYING TRASH | |
| INCIDENT ② | SUSPECT ② | HEIGHT: 5'-11" | ② |
| | | WEIGHT: 210 | ② |
| | | HAIR COLOR: LIGHT BROWN | ② |
| | VICTIM | NAME: TOM LEE | |
| | | ADDRESS: 594 ROSE ST. | |
| | CRIME | DATE: 6/1/99 | |
| | | LOCATION: STREET | |
| | | TYPE: ASSAULT | |
| | | DESCRIPTION: VICTIM WAS WALKING ON STREET | |
| INCIDENT ③ | SUSPECT ③ | HEIGHT: 5'-11" | ③ |
| | | WEIGHT: 150 | ③ |
| | | HAIR COLOR: BLACK | ③ |
| | VICTIM | NAME: JOHN THOMAS | |
| | | ADDRESS: 624 FIRST ST. | |
| | CRIME | DATE: 8/1/99 | |
| | | LOCATION: PARKING GARAGE | |
| | | TYPE: ROBBERY | |
| | | DESCRIPTION: VICTIM WAS EXITING GARAGE ON FOOT | |

FIG-21A

| SEARCH CRITERIA | | |
|---|---|---|
| INCIDENT | SUSPECT | HEIGHT: 5'-11" |
| | | WEIGHT: 220 |
| | | HAIR COLOR: BROWN |
FIG-21B
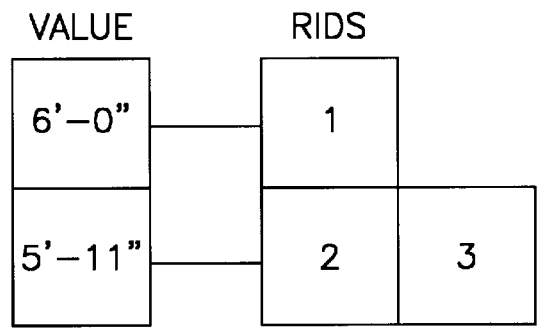
DATA BAND FOR INCIDENT/SUSPECT/HEIGHT
FIG-21C
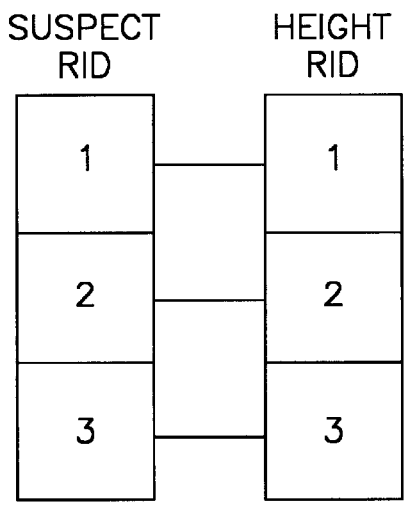
RELATION BAND FOR INCIDENT/SUSPECT/HEIGHT
FIG-21D

RELATION BAND FOR INCIDENT/SUSPECT

| SCORE BUFFER | TYPE OF SCORING (MEASURE) | BAND INCIDENT/SUSPECT | SEARCH CRITERIA |
|---|---|---|---|
| ① | CONTRAST RANGE (5'-9", 6'-1") | HEIGHT | 5'-11" |
| ② | CONTRAST RANGE (200, 240) | WEIGHT | 220 |
| ③ | COMPARE EXACT | HAIR COLOR | BROWN |

|  |  | RID 1 | RID 2 | RID 3 |
|---|---|---|---|---|
| HEIGHT | SCORE BUFFER 1 | 0.75 | 1.0 | 1.0 |
| WEIGHT | SCORE BUFFER 2 | 0.4 | 0.9 | −0.2 |
| HAIR COLOR | SCORE BUFFER 3 | 1.0 | 0 | 0 |
| SUSPECT | SCORE BUFFER 4 | 0.716 | 0.633 | 0.266 |
|  | SCORE BUFFER 5 | 0.716 | 0.633 | 0.266 |

| COMPUTE PARENT SCORE ||||| 
| SCORE BUFFER | TYPE OF PARENT SCORE ALGORITHM | BAND | SCORE BUFFER ID | WEIGHTING |
| --- | --- | --- | --- | --- |
| ④ | OVERALL SUM | INCIDENT/SUSPECT HEIGHT | ① | 1/3 |
| ④ | OVERALL SUM | INCIDENT/SUSPECT WEIGHT | ② | 1/3 |
| ④ | GREEDY SUM | INCIDENT/SUSPECT HAIR COLOR | ③ | 1/3 |
| ⑤ | SINGLE BEST | INCIDENT/SUSPECT | ④ | – |

FIG-21H

| ADDITIONAL DATABASE ENTRIES ||||
| --- | --- | --- | --- |
| INCIDENT ④ | SUSPECT ④ | HEIGHT: 6'-0" | ④ |
|  |  | WEIGHT: 200 | ④ |
|  |  | HAIR COLOR: RED | ④ |
| INCIDENT ④ | SUSPECT ⑤ | HEIGHT: 6'-0" | ⑤ |
|  |  | WEIGHT: 210 | ⑤ |
|  |  | HAIR COLOR: BROWN | ⑤ |

FIG-21I

DATA BAND FOR
INCIDENT/SUSPECT/HEIGHT FOR DATABASE (FIG-21I)

RELATION BAND FOR SUSPECT/HEIGHT

RELATION BAND FOR INCIDENT/SUSPECT

|  | RID 1 | RID 2 | RID 3 | RID 4 | RID 5 |
|---|---|---|---|---|---|
| SCORE BUFFER 1 | 0.75 | 1.0 | 1.0 | 0.75 | 0.75 |
| SCORE BUFFER 2 | 0.4 | 0.9 | −0.2 | 0.4 | 0.9 |
| SCORE BUFFER 3 | 1.0 | 0 | 0 | 0 | 1.0 |
| SCORE BUFFER 4 | 0.716 | 0.633 | 0.266 | 0.716 | 0.883 |
| SCORE BUFFER 5 | 0.716 | 0.633 | 0.266 | 0.883 |  |

| SBS Document Compare | | | |
|---|---|---|---|
| Question | Anchor | Score | 1 |
| ⊞ Known Offenders | | 29.56% | |
| Primary Key | 003 | 33.33% | 001 |
| ⊞ Person | | 25.78% | |
| ⊞ Name | | 55.00% | |
| Honorarium | | | Mr. |
| First | James | -50.00% | John |
| Middle | Q | 100.0% | Q |
| Last | Public | 100.0% | Public |
| Suffix | | | |
| ⊞ Address | | 22.34% | |
| Street | 123 Anystreet | 65.91% | 123 Main St |
| City | Anycity | 61.88% | Anytown |
| State | Florida | | Texas |
| Zip | 35729 | 20.00% | 78729 |
| ⊞ Description | | | |
| Eye Color | Brown | | Brn |
| Hair Color | Black | | Brn |

FIG-25

SYSTEM AND METHOD FOR PERFORMING SIMILARITY SEARCHING

TECHNICAL FIELD OF THE INVENTION

The present invention relates generally to similarity search engines. More particularly, the invention is a computer-implemented similarity search system and method that allows for efficiently searching very large source databases for similarity search criteria specified in a query. A database to be searched, called the source database, is translated into a hierarchical database having objects composed of children and parent objects that correspond to the categories that a user wants to search. Data to be searched in the hierarchical database is organized into a data structure according to the categories the user wants to search and is given a relative identifier. An indexing structure is created that associates parent and children objects. Children objects are assigned a score that is a quantitative measurement of the similarity between the object and the search criteria. A scoring algorithm, which may be selected by the user, assigns the similarity score. The data and indexing structures provides for efficient similarity searching and the quick reporting of results because searching is done using the data structure categories. Children scores are combined into parent scores according to an algorithm specified by the user. Children scores within a parent may be weighted so that certain child categories may be given more importance when child scores are combined into parent scores. The invention can be utilized for searching most types of large-scale databases.

BACKGROUND

Modern information resources, including data found on global information networks, form huge databases that need to be searched to extract useful information. Existing database searching technology provides the capability to search through these databases. However, traditional database search methods usually provide precise results, that is either an object in the database meets the search criteria and belongs to the results set or it does not. However, in many cases it is desirable to know how similar an object is to the search criteria, not just whether the object matches the search criteria. This is especially important if the data in the database to be searched is incomplete, inaccurate or contains errors such as data entry errors or if confidence in the search criteria is not great. It is also important to be able to search for a value or item in a database within its particular data context to reduce the number of irrelevant "matches" reported by a database searching program. Traditional search methods of exact, partial and range retrieval paradigms fail to satisfy the content-based retrieval needs of many emerging data processing applications.

Existing database searching technology is also constrained by another factor: the problem of multiple data sources. Data relevant to investigations is often stored in multiple databases or supplied by third party companies. Combining the data by incorporating data from separate sources is usually an expensive and time consuming systems integration task. However, if a consistent ranking or scoring scheme is used for identifying how similar an object is to the search criteria, then that same search criteria can be used to rank other objects in the same search categories in multiple databases. By using a consistent ranking or scoring scheme, it is possible not only to know how similar the object is to the search criteria, but also how similar objects are to each other and then be able to choose the best match or matches for the search criteria from multiple database sources.

SUMMARY

The present invention, which is a system and method for performing similarity searching, solves the aforementioned needs.

The present invention is a computer implemented method for detecting and scoring similarities between documents in a source database and a search criteria. It uses a hierarchy of parent and child categories to be searched, linking each child category with its parent category. Source database documents are converted into hierarchical database documents having parent and child objects with data values organized using the hierarchy of parent and child categories to be searched. For each child object, a child object score is calculated that is a quantitative measurement of the similarity between the hierarchical database documents and the search criteria and a parent object score are computed from its child object scores. Creating a hierarchy of parent and child categories further comprises assigning an entry in a data structure called a data band to each child category that contains no children categories. Linking each child category with its parent category further comprises assigning an index to connect each child category with its parent category. Converting the source database into a hierarchical database further comprises populating each data band with data values from each child object that contains no children. Each data value is assigned a relative identifier. Calculating a score further comprises, for each data value in the data band that is assigned a relative identifier, assigning a number for the score that represents how similar and dissimilar the value is to the search criteria. The search criteria are contained in a query, which may be generated by a user.

The source database may be a relational database. The hierarchical database may be created by a user mapping between the schema and data in a preexisting source database. The hierarchical database may be stored in a markup software language. The markup language may be Extensible Markup Language (XML) or Standard Generalized Markup Language (SGML). The similarity search criteria as specified by the user in the query is also translated into a markup language. Calculating a similarity score comprises comparing the search criteria saved in a markup software language to the data values in the data bands of the hierarchical database. The score calculated may be saved in a score buffer indexed by the relative identifier for the data value. A scoring algorithm may be used to assign a number for the score. Determining a score for each child object comprises, for each data value in the data band that is assigned a relative identifier, using a scoring algorithm to assign a number that represents how similar and dissimilar the value is to the search criteria and saving the score in a score buffer, which may be indexed by the relative identifier for the data value. Alternatively, the scoring method may be non-algorithmic. If the scoring is not algorithmic and if the data value in the data band matches the search criteria, the score number assigned is a value that represents a match between the data value and the search criteria.

The schema may further comprise a hierarchy of parent and child categories to be searched, a scoring method for calculating the score for each child object, a weighting for each child object when there are multiple child objects within a parent object and a parent score computing algorithm for computing a parent object score from the child object scores. The schema may be defined by a user using a graphical user interface or may be previously defined and stored in a database. The saved schema may be retrieved from a database containing stored schemas and used for another similarity search. The schema may further comprise specifying the maximum number of values in the data band on which to perform scoring and score summing and the type and content of a result report generated after the computing of the parent object scores has been completed. The result report may be displayed to the user on a client computer having a graphical user interface.

Schema commands may be compiled by a similarity search engine, relative identification table for the schema created, and data bands to represent the data structure and relation bands created to represent the indexing structure. A document table is created to store user documents when they are imported into the system to be searched. Relative identifiers are assigned to data values in the data bands and to the parent objects. The relative identifiers for the parent objects are stored in the relation bands. A relative identification and system identification table is created to store the mapping between the relative identifiers assigned to the data values in the data bands and a system identifier for the document. A data structure called data band is created for each child object and an entry for each data band is created in a relative identification table of parent and child objects. For each parent object, the index (called a relation band) links the child object and the parent object and a relation band entry is created in a relative identification table of parent and child objects. Data bands are created for all child objects and relation bands are created for all parent objects.

A parent object score is computed using a parent score computing algorithm. The parent score computing algorithm identifies the child score buffers and the indices (relation bands) to their parent objects. Using the relation bands, the parent score to be computed is identified. The value of the parent score buffer from the child score buffers is computed using the parent score computing algorithm and the process is repeated until all parent scores are computed. The parent score computing algorithm may be selected from the group consisting of single best, greedy sum, overall sum, greedy minimum, overall minimum and overall maximum. The computing of the parent object score value may also comprise using a weighting function to assign weights to the child score buffers and using those assigned weights in the parent score computing algorithm.

The present invention is a computer implemented method for detecting and scoring similarities between documents in a source database and a search criteria. A schema containing a hierarchy of parent and child categories for searching is used. Each document within the source database is converted into a hierarchical database document having a data structure of parent and child objects, and an indexing structure linking each child object to its parent object. For each child object in the hierarchical database, the data structure is populated with the data values from each child object and the child object is linked to its parent object using the indexing structure. Using a query that contains the similarity search criteria, for each data value in each child object, a data value score that is a quantitative measurement of the similarity between the data value and the search criteria of the query is calculated. The query may be dynamically defined by a user or may retrieved from a database of stored queries. A child object score is determined using the data value scores. A parent object score is then computed from its child object scores.

The data structure comprises an entry for each child object to be searched with each entry containing the data values from each child object. Each data value in the child object has a relative identifier. The indexing structure linking each child object to its parent object comprises an index that links each child object with its parent object. Each entry for each child object to be searched is called a data band, which contains the data values from each child object, the data values having the relative identifiers. The index that links each child object with its parent object is called a relation band. Calculating a data value score comprises calculating a score for each data value in the data band and saving the score in a score buffer.

Cross data base searching may be performed using the same schema and query for each of N number of source databases. The search criteria and the results for the N source databases may be displayed on a user's computer graphical user interface.

The database further comprises a global table for inserting scoring and parent object computing compiled commands waiting to be executed. Scoring optimization comprises, when a scoring command is about to be executed by the virtual machine, checking the global table to determine if a preexisting scoring command waiting to be executed uses the same data band as the scoring command. If so, the scoring command is added to a thread for the preexisting scoring command and the thread is executed.

Parent score computing optimization comprises when a parent object score command is about to be executed, checking the global table to determine if a preexisting command waiting to be executed uses the same relation band as the computing a parent object score command. If so, the parent object command score is added to a thread for the preexisting command and the thread is executed.

The present invention comprises a system for detecting and scoring similarities between items in a source database and a search criteria comprising at least one client computer having a graphical user interface for entering client commands including schemas, importing documents to be searched, and entering a similarity search query. The system has a network interconnecting the client computer to a similarity search engine server computer. The similarity search engine server comprises a search engine compiler for compiling client commands received from the client computer, a virtual machine for executing the client commands, a document comparison function for executing document comparison commands, and a file storage and services function for processing document data and storing schemas, data types and document data. The system has a data storage device for storing search engine data, document data and relative identifiers.

The present invention comprises a system for detecting and scoring similarities between items in a source database and a search criteria comprising a client computer for defining a schema containing a hierarchy of parent and child categories to be searched and for importing and translating the source database into a hierarchical database using the schema. The client computer allows the user to define a query that contains similarity search criteria. The client computer sends commands to a similarity search engine computer to be processed. The similarity search engine computer comprises a compiler for compiling commands from the client computer. It also comprises a virtual machine for organizing each parent and child object into a data structure and creating an indexing structure that links the child categories of the schema with its parent category and for converting each document in the source database into a hierarchical database having parent and children objects corresponding to the schema defined hierarchy of parent and children objects. For each child object in the hierarchical database, the data structure is populated with the data values and child object is linked to its parent object using the indexing structure. The virtual machine calculates a data value score for each child object that is a quantitative measurement of the similarity between the search criteria and the child object. Child object scores are determined using the data value scores and a parent object score is computed from its child objects. The similarity search engine also comprises a document comparison function for executing document comparison commands and a file storage and services function for creating a document table for storing hierarchical database documents when they are imported into the similarity search engine server and a relative identification to system identification table to map between relative identifiers and primary keys in the hierarchical database. The system contains a database for storing the document table and relative identifiers for the database documents, storing data bands and relation bands and storing a table of relative identifiers.

BRIEF DESCRIPTION OF THE DRAWINGS

These and other features, aspects and advantages of the present invention will become better understood with regard to the following description, appended claims and accompanying drawings where:

FIG. 1 is a system architecture diagram of the similarity search engine computer system illustrating a client-server configuration.

FIG. 2 is an example of a graphical user interface for defining a schema.

FIG. 3 shows an example of a graphical user interface displaying a document that has been organized according to the schema of FIG. 2.

FIG. 4a shows an example of the creation of a query using a graphical user interface.

FIG. 4b shows an example of a portion of a query that specifies the fields of the database that are returned to the user with the similarity search score.

FIG. 21a shows an example of a database containing three incidents.

FIG. 21b is an example of search criteria from a schema initiated by user.

FIG. 21c shows the data bands created for Incident/Suspect/Height for the database entries of FIG. 21a.

FIG. 21d shows the relation bands created for Suspect/Height.

FIG. 21h shows the commands for parent object scoring.

FIG. 21i contains additional database entries.

FIG. 25 shows an example of a graphical user interface displaying the results of a document comparison similarity search.

DETAILED DESCRIPTION OF THE DRAWINGS

Figure 5:
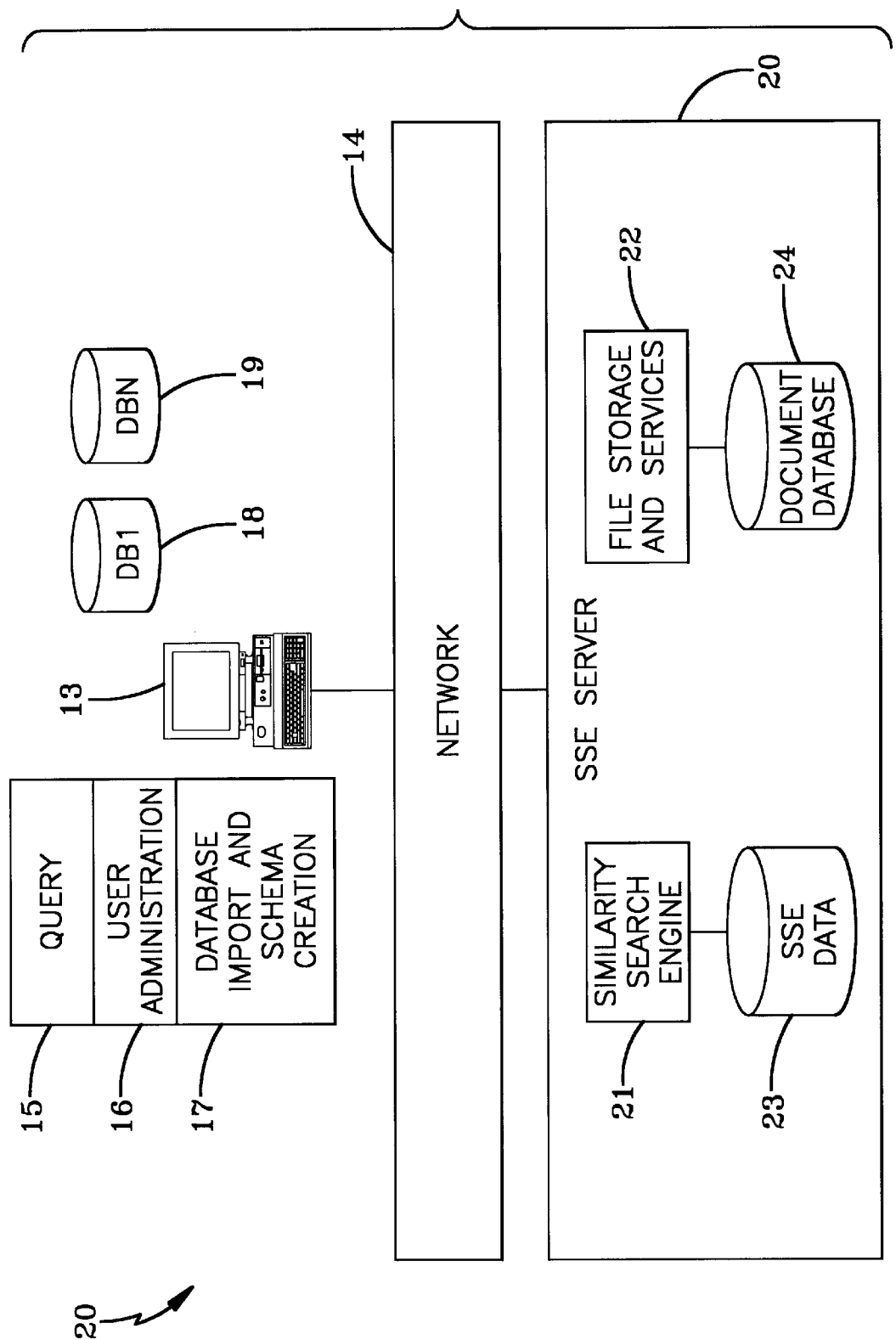
FIG. 5 is a system architecture diagram of the similarity search engine computer system illustrating a single client computer configuration.

Prior to the detailed description of the figures, a brief discussion and definition of terms used in the present invention is provided.

Similarity searching is the process of determining how similar or dissimilar data are to a user's search criteria. In the present system, the data to be similarity searched (called the source data) is assigned a numerical score that is a quantitative measure of the similarity between the source data and search criteria. The data to be similarity searched may be entered by the user, may be in a single stored document or may be embodied in a database containing many documents. Throughout the description of the drawings, it is assumed that the database contains multiple documents to be searched, however, similarity searching can also be done on a single document or on data entered by the user. Most databases that contain information that a user wants to search are relational databases, however the present system provides for searching of all types of databases by allowing the user to map between the categories to be searched and the fields of the source database. The present invention translates the data to be searched, whether it is a entered by the user or stored in a relational database, into a hierarchical form and stores that data in hierarchical database, which has a tree type structure with parent and child objects.

In the present system, the hierarchical database is stored in a data description language called Extensible Markup Language (XML) together with indexing structures called bands. XML is a World Wide Web consortium standard that allows for the creation of tags that identify data. XML encapsulates data inside custom tags that carry semantic information about the data. The tags describe each piece of data. Since the tagging categories may be standardized, XML facilitates the interchange of data. Other languages, besides XML that support and model data hierarchically can also be used.

A schema is a model of the problem domain. It contains only structural and other kinds of meta-data. It forms a series of parent and child relationships or categories arranged in a hierarchical tree type structure that correspond to the objects in the source database that the user is interested in similarity searching. A data band is created for each leaf on the schema hierarchy tree. A data band represents all items in a particular category that exist in the database or document to be searched. Each piece of data in a data band is assigned a relative identifier (RID) that is unique only within their specific context. For example, if the user wants to search for an Incident/Crime/Person/Name, a data band is created for the leaf Name. The data bands assigned according to the schema contain only the data structure, not the source data to be similarity searched. A relation band is created for each link between the leaf and its immediate parent. A relation band is used to connect the child data to the parent data.

The schema chosen or generated by the user is used to translate and structure the source data to be searched into a hierarchical form when a source database is imported into the system. The user can map between fields of the source relational database and the categories in the schema. Alternatively, the user can create a new document using the schema categories and enter the data available. The schema describes and structures the unpopulated data bands. When the source data is imported into a data structure, the data is mapped into bands according to the schema. A data band represents all items in a particular category that exist in the database or document to be searched. Each piece of data in a data band is assigned a relative identifier (RID) that is unique only within their specific context. A relation band is used to connect the child data to the parent data. FIGS. 12a through 12d, which are discussed in detail below, illustrate the concept of data and relation bands. The schema allows the user to specify the search criteria for similarity searching and "scoring" documents for similarity. The schema specifies the search categories, a scoring algorithm (called a measure) used to determine the type of similarity score to be given to the source data objects, and a parent score computing algorithm (also called a choice algorithm or score summing algorithm) for determining how to compute the similarity scores for the their parent objects using the scores from the child objects. The schema also includes a weighting value that determines the relative weight given to child objects that have the same parents. That weighting is used together with the parent score computing algorithm to sum the similarity scores for the source data child objects into their parent objects.

A query is the actual search request containing the search criteria. It is usually dynamically specified by the user, but can also be a previously generated stored query. Once the query is entered, the similarity search scores are assigned, the parent scores are computed from their children and report results are generated.

FIG. 1 is a system architecture diagram of the similarity search engine computer system illustrating a client-server computer configuration. The computing system 10 comprises one or more general-purpose computers 11 and 12 interconnected by a network 14. The network connects the general purpose computers 11 and 12 to one or more similarity search engine (SSE) server computers 20. The network 14 may be, but is not limited to, the Internet, a Wide Area Network (WAN), a Local Area Network (LAN) or a wireless network. The SSE server computer 20 contains a similarity search engine SSE 21 and file storage and services system 22. The SSE server 20 may include a SSE database 23 and a document database 24 utilized by the file storage and services system 22. Alternatively, the SSE server 20 may be connected to the SSE database 23 and the document database 24 that are located external to the SSE server 20.

The graphical user interface of the general purpose computers 11 and 12 is utilized to create a search hierarchy (called a schema) 25, to request the import of a database to be similarity searched 17, to define a query 15 and for user administrative functions 16. A schema is a set of statements that model the problem domain. The schema forms a series of parent and child relationships or categories arranges in a hierarchical tree type structure that corresponds to the objects in the source database that the user is interested in similarity searching. A user, via the graphical user interface, may define the schema or it may be a default schema previously saved on disk. FIG. 2 shows an example of a graphical user interface for defining a schema. The left-hand portion of the screen 26 shows the hierarchical similarity search question set for a similarity search for known offenders. Known offender is the parent object or category. Below the parent object are the child objects of person (who are known offenders) and relative. The person object contains the child object's name, address and description. The relative object consists of the child object's name, which in turn has child objects first, middle and last names. Each object is assigned a data type, either according to a system default or by the user. The core data types assigned include text (used for all objects that have no children), folder (used with all question with children), multiple choice (used for questions with a list of predefined answer options), primary key (internal data type to uniquely represent a document) and binary (used for all non-textual data, such as images or sound clips). Users can modify certain default settings for these data types, but cannot delete the data types. The core data types may be inherited or extended from parent objects to children. Inheriting or extending a data type means the child inherits the properties of its parent. New properties and modification of properties are allowed for the child, but properties that originate in the parent or any ancestor cannot be changed or removed. Data types allow the user to logically group a set of questions together in the schema, give that grouping a name and thereby imply a meaning. Once the grouping is defined, the user is able to search against a similar group structure. Once the data type name has been defined and included in the schema, other databases and schemas can also be searched. For example, if the data type name (having a first middle and last name) is defined, it can be used to search for names in another database.

Once the schema has been defined, the user can import documents to be similarity searched. In order to facilitate similarity searching, the documents are organized using the hierarchy of the schema. Most documents to be searched exist in relational databases. It is necessary to translate the relational database to a hierarchical database and this is done utilizing the schema that the user has created. The hierarchy of a document remains consistent with its schema. FIG. 3 shows an example of a GUI displaying a document that has been organized according to the known offender's schema of FIG. 2. The data in the document is the name, address, and eye color and hair color of a known offender and has been organized utilizing the known offender data types of the schema of FIG. 2.

After the schema has been defined and the relational database converted to a hierarchical database utilizing the data types of the schema, a query can be generated by the user at the graphical user interface of the general purpose computer (11 of FIG. 1). The query allows the user to specify the search criteria for similarity searching and "scoring" documents for similarity. FIG. 4a shows an example of the creation of a query using the graphical user interface of the general-purpose computer (11 of FIG. 1). In FIG. 4a, the user wants to find a person named "John Q. Public" having an address as shown. FIG. 4b shows part of the query that specifies the fields of the database that are to be returned to the user with the similarity score. In this case as indicated by the check marks, the user wants the document primary key, which identifies the document, the first and last name of the person and the person's city returned to the user. This may be returned in the form of a display, a printout or data saved in a report database. The query may contain a number of other fields, including the number of documents to return. Details of the query and its processing are discussed below.

Turning back to FIG. 1, once the schema 25, database to import 17 and query 15 are generated at the client computers (11 and 12), they are sent to the similarity search engine (SSE) server 20. Alternatively, the query function 15, user administration function 16 and database import 17 and schema creation functions 25 may be executed in a single client computer as shown in FIG. 5. FIG. 5 is a system architecture diagram of the SSE computer system 20 of the similarity search engine illustrating another embodiment of the client-server computer configuration, the query 15, user administration 16, database import and schema creation functions 17 are executed on a single computer 13. In the client-server networked computer configuration, they are sent via the network 14.

Figure 6:
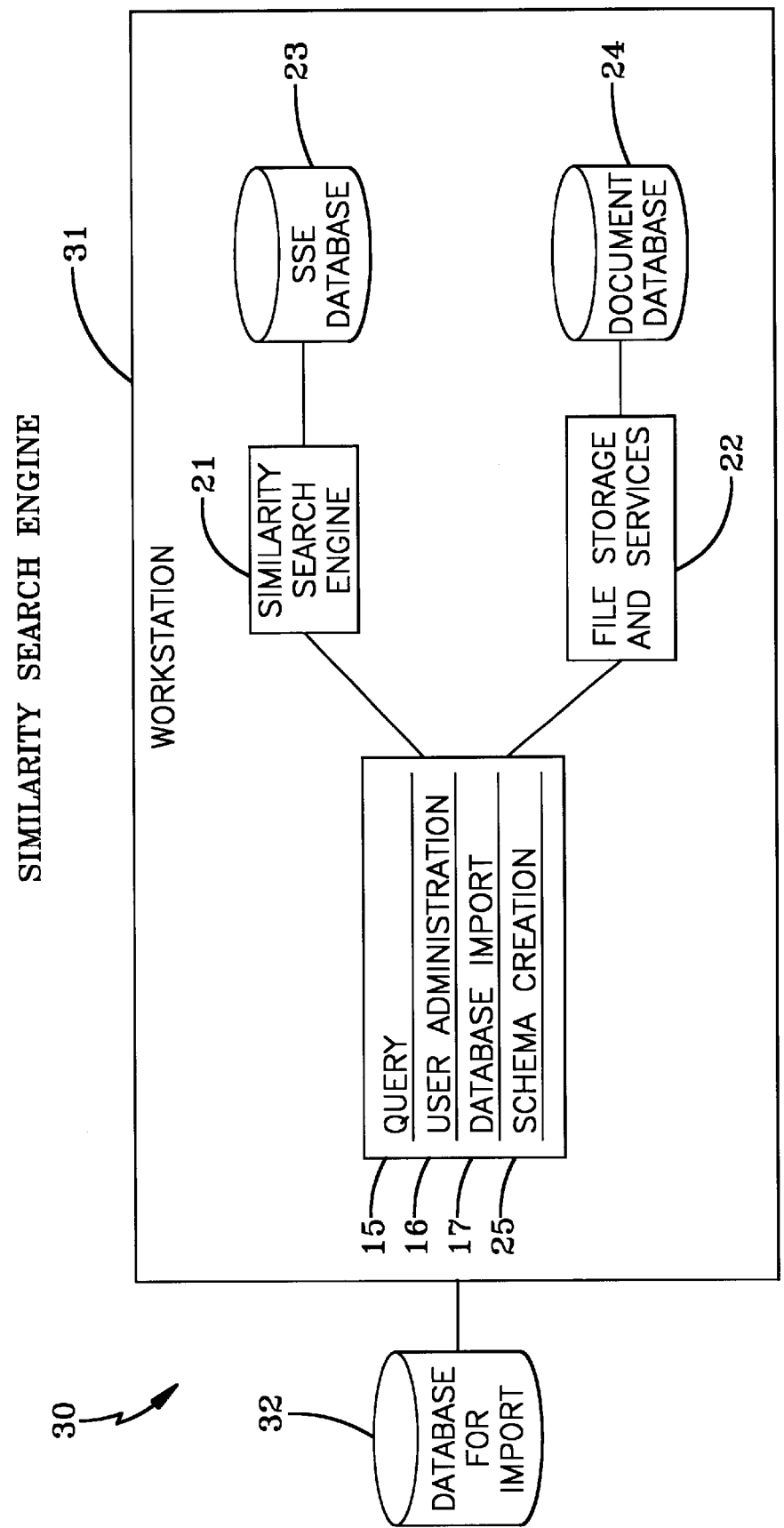
FIG. 6 shows a system architecture diagram of the similarity search system in a standalone computer configuration.

FIG. 6 shows a system architecture diagram of the similarity search system in a standalone computer configuration. The similarity search system 30 comprises a workstation 31 containing the query 15, user administration 16, database import 17 and schema creation functions 25 along with the similarity search engine SSE 21, file storage and services system 22, SSE data 23 and document database 24. A database 32, containing the data to be imported for search by the query, may be external to the system. Alternatively, the SSE database 23 and the document database 24 may be located external to the work station 31.

Figure 7:
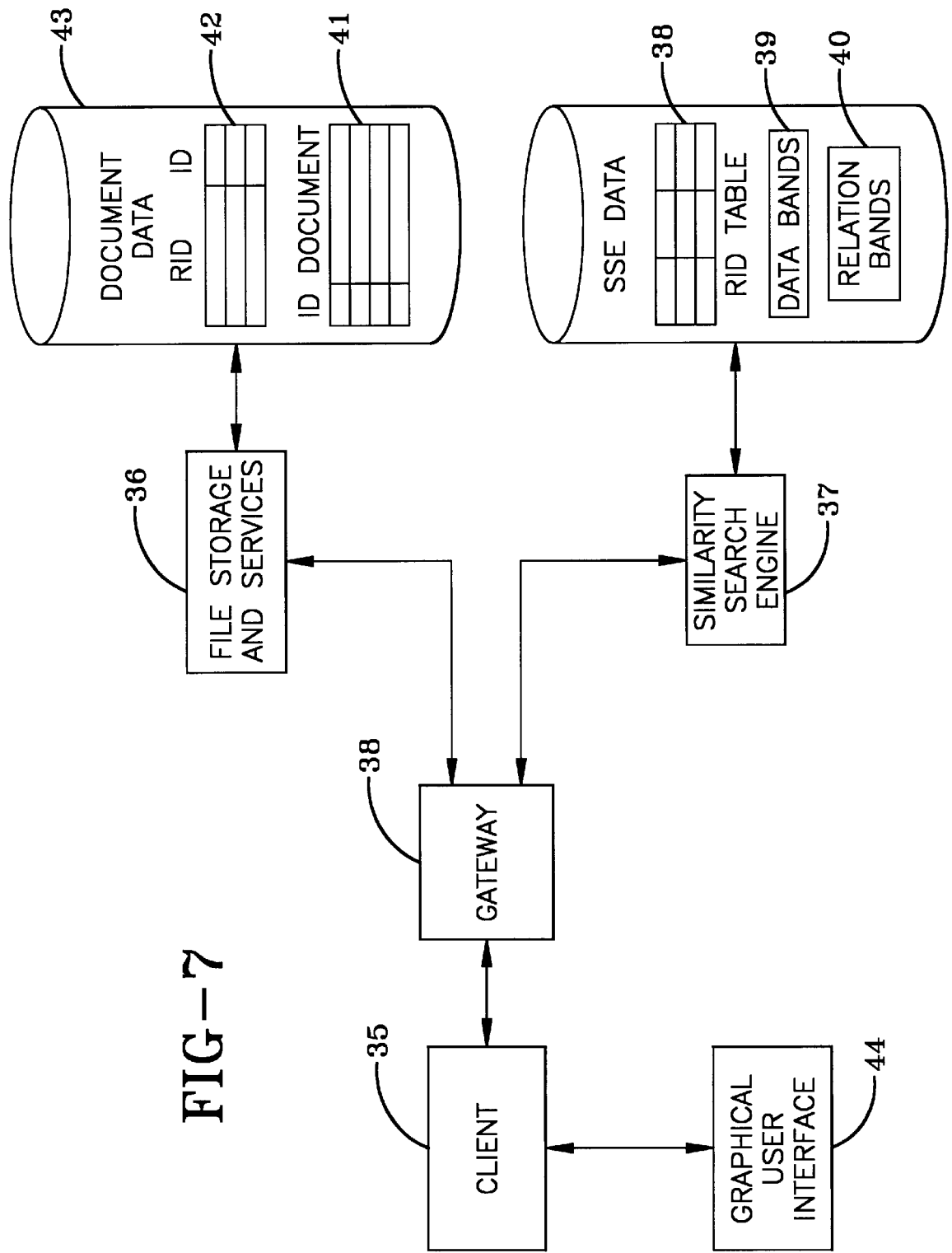
FIG. 7 shows a block diagram of the similarity search system.

FIG. 7 shows a block diagram of the similarity search system. The client 35 interfaces with the file storage and services (FSS) 36 and the similarity search engine (SSE) 37 via a gateway 38. The gateway receives commands from the client 35 (which are entered via the client's graphical user interface 44) and search results from the SSE 37, routes the commands and search results and performs any necessary translations of the command and search results. In one version of the present system, the client 35 translates the client command, which may be a query, a user administrative function, document import or schema creation command, and any associated data into a data description language, called Extensible Markup Language (XML). The XML data description language is helpful in allowing users to model data hierarchically. The command, as translated into XML, is then compiled into micro-commands within SSE 37. The SSE 37 performs a number of functions including compiling the commands, assigning relative identification numbers (called RIDs) to new data to be searched, maintaining an RID table 38, organizing the data to be searched into data bands 39 according to the categories to be searched, relating child data with parent data using relation bands 40, executing the query according to the algorithm chosen by the user, scoring the results from the query and combining the child scores into the parent scores according to an algorithm chosen by the user. The file storage and services function (FSS) 36 creates and stores document data 43. The document data includes the data to be searched using the query. The FSS 36 creates a document table 41 to store the imported documents. The FSS 36 creates a relative identification (RID)/identification table 42 that maps between the RIDs which are assigned and used by the SSE 37 and the system document ID which is the primary key used throughout the rest of the system and by the user to identify a document. Alternatively, the FSS may include a mapping back to the relational database imported by the user.

Figure 8:
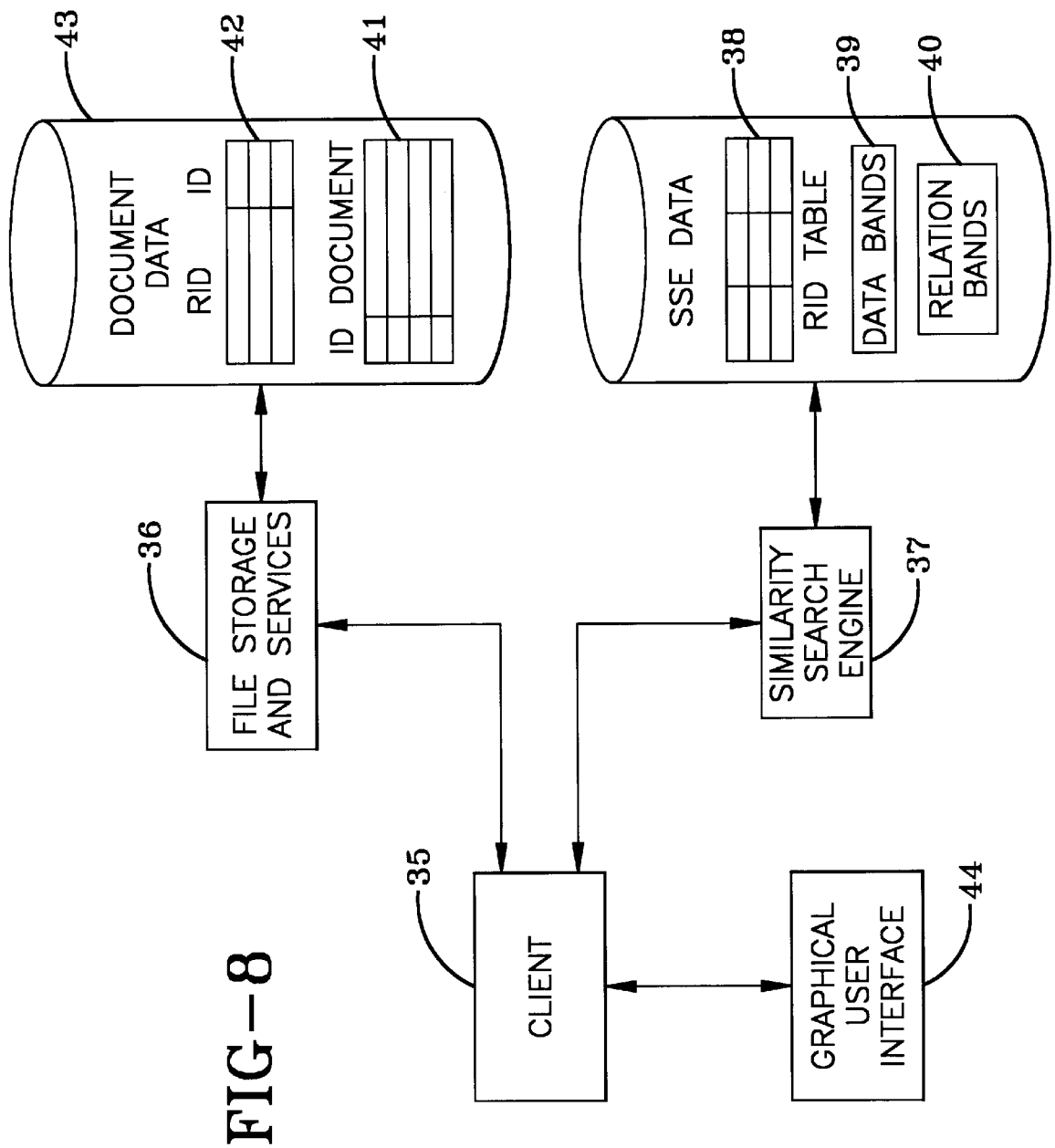
FIG. 8 shows a system architecture diagram of the similarity search system in a standalone computer configuration.

FIG. 8 shows a system architecture diagram of the similarity search system in a standalone computer configuration. The architecture is similar to that shown in FIG. 7, with the exception that the gateway 38 is not present. The client machine 35 interfaces directly with the FSS 36 and the SSE 37.

Figure 9:
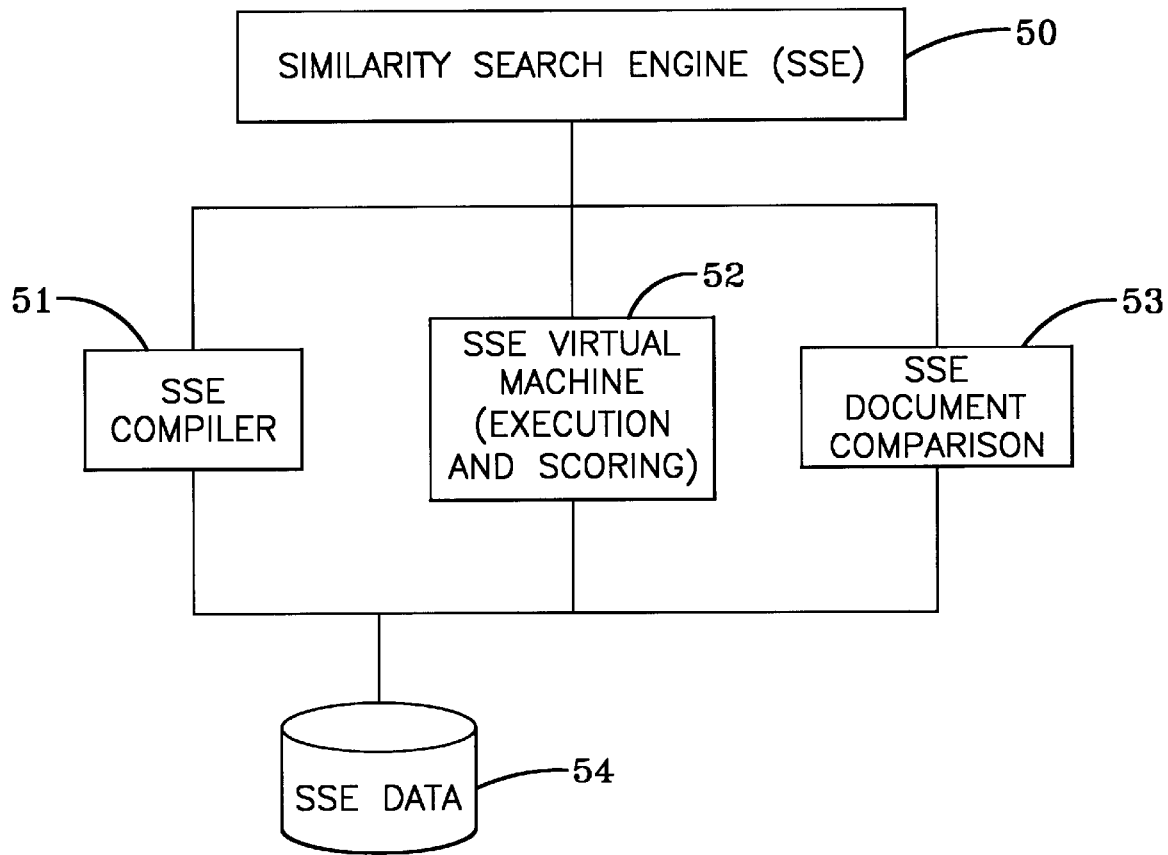
FIG. 9 is a block diagram of the similarity search engine.

FIG. 9 is a block diagram of the similarity search engine (SSE) 50. The SSE has three major components: SSE compiler 51, SSE virtual machine for execution and scoring 52 and SSE document comparison function 53.

When a command is received from the client, a check is first made to determine the type of command. If the command is a document compare type of query request, the SSE sends the command to the SSE document comparison function 53. The document comparison function 53 processes a query command that request documents be compared. The document comparison function incorporates score ranking similarity and similarity/dissimilarity matching to identify patterns in searches. It provides for the ability to rapidly analyze documents in a side-by-side fashion.

If the command schema creation command or document related command such as write, update and delete or a query execution command and is not a document compare command, the SSE compiler 51 takes the command and compiles it into SSE commands that can be executed by the SSE virtual machine execution and scoring function 52. The SSE virtual machine executes all commands with the exception of document compare query requests. The SSE data 54 contains relative identification, data band and relation band data used by the SSE virtual machine 52.

Figure 10:
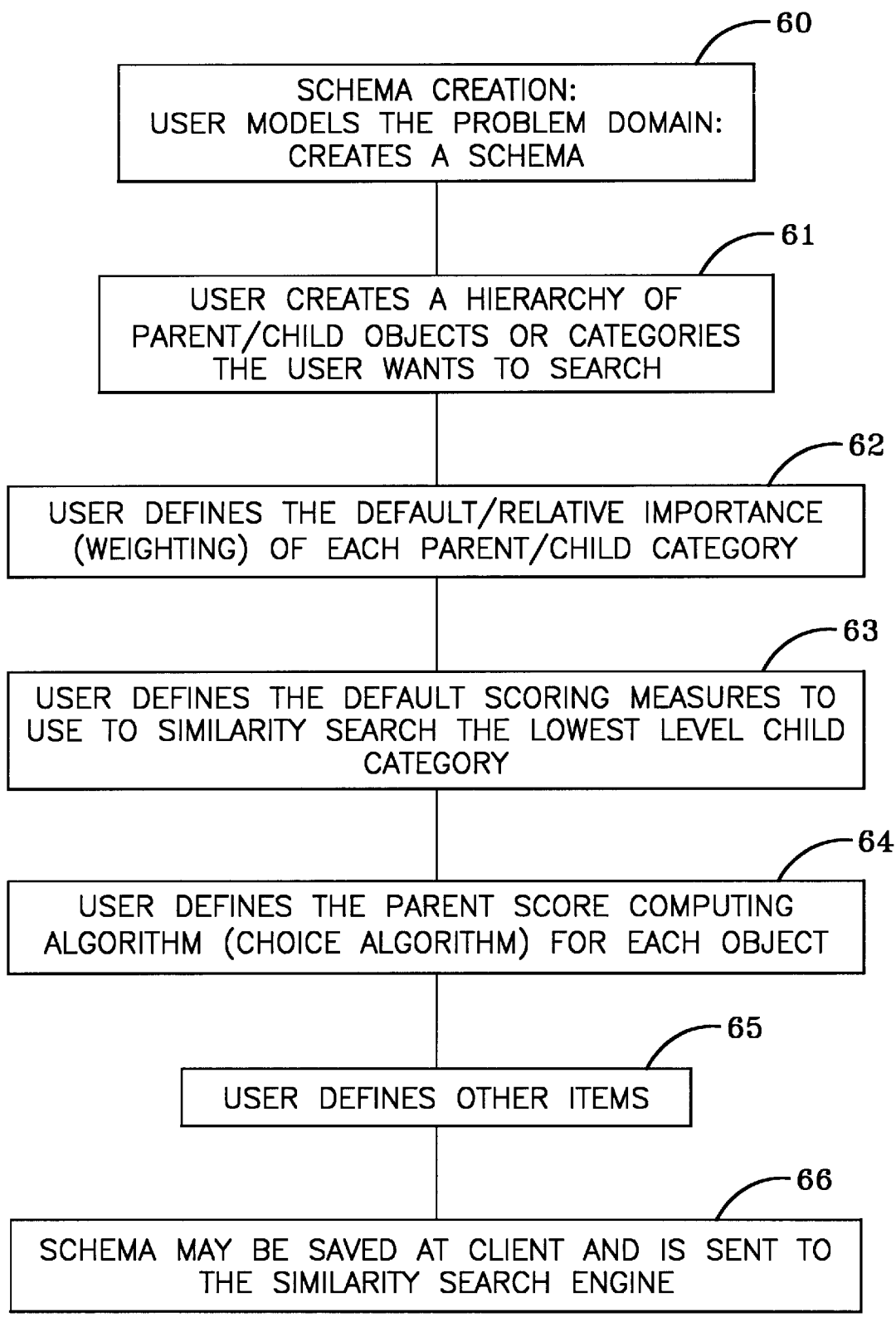
FIG. 10 shows a flowchart of the schema creation by user.

FIG. 10 shows a flowchart of the schema creation by user. The user models the problem domain and creates a schema 60. The user creates a hierarchy of categories in the form of parent/child objects or categories that the user is interested in searching 61. The user defines the default relative weighting of each parent/child object 62. The user defines the default scoring method (measure) to use to similarity search the lowest level child object 63. The user defines the parent score computing algorithm (choice algorithm) for each object 64. The user may also define other items of interest, including but not limited to, another database to cross-search, a maximum number of scores to return to control the length and corresponding time of the search, the type and content of the report of the results to the user 65. The problem domain model as represented in the schema may be saved at the client and is then sent to the SSE 66.

Figure 11:
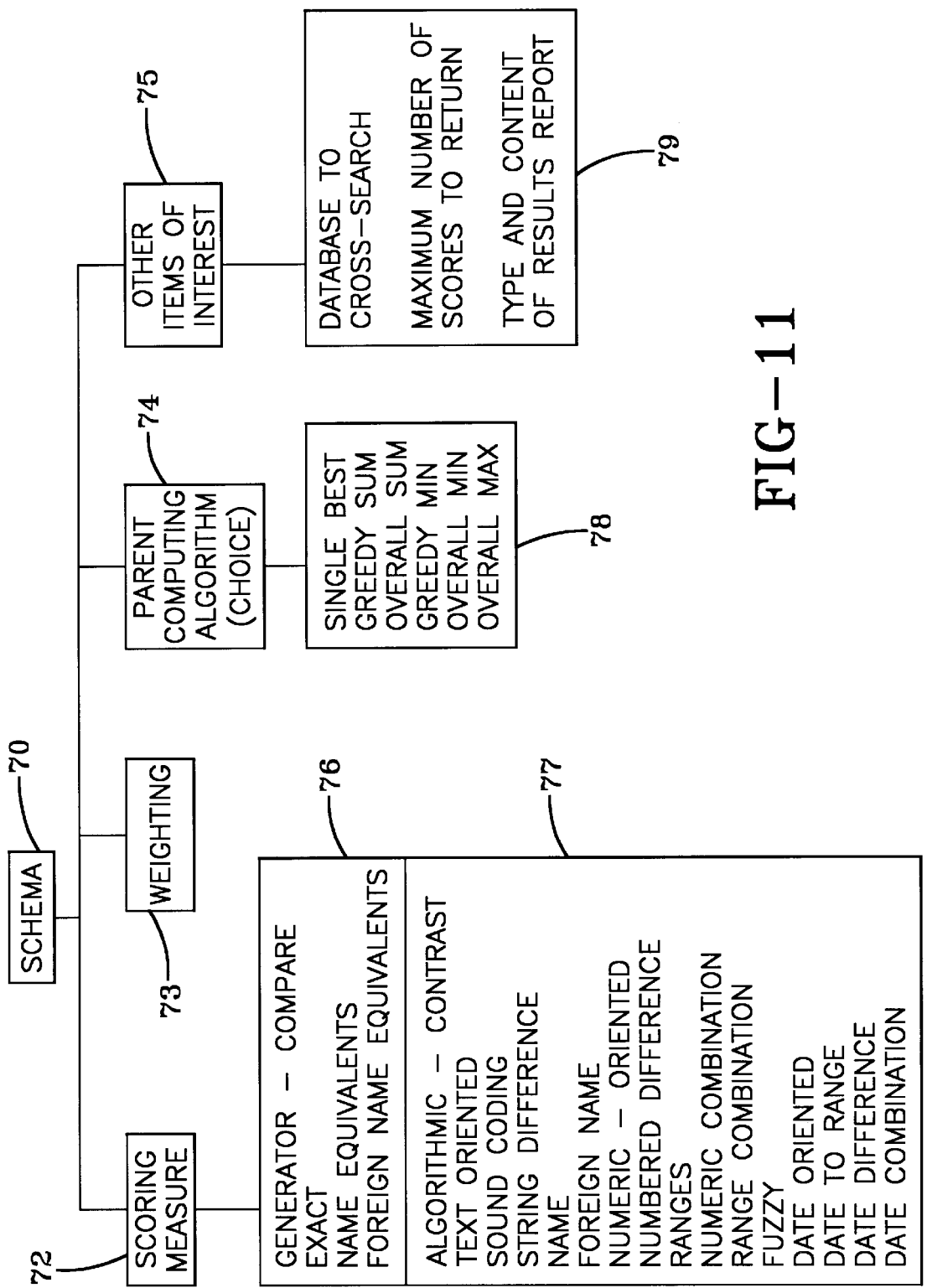
FIG. 11 is a block diagram of the problem domain as represented in the schema.

FIG. 11 is a block diagram of the problem domain as represented in the schema 70. The schema includes the scoring methods (called measures) 72, weighting within categories 73, and a parent score computing algorithm (called a score summing or choice algorithm) 74 along with other items specified by the user 75.

A scoring method (or measure) determines the type of similarity score to be given to the source data objects. The scoring method (or measure) type may be a generator 76 or algorithmic 77 in nature. A scoring method that is a generator 76 generates values for the search engine to use for comparison and then does a compare type of search on the data. Generator types may include exact, name equivalents and foreign name equivalents 76. The user may define other types of generators. An exact scoring method generates the exact value for the search engine to use in its comparison. A name equivalent scoring method generates an English language name along with similar names and nicknames. A foreign name equivalent scoring method generates a foreign name along with similar foreign names and nicknames. The name relationships may also be user defined. When the search engine does the search, the generated values are compared to the entries in the data band. A compare type of search looks only for similarity, doing so by performing a fast lookup in the data band. A match receives a preset score. Non-matching entries receive a default score, which is typically indicated by zero.

A scoring method that is algorithmic 77 in nature results in a contrast type search, which scores similarity and dissimilarity. Scoring methods that are algorithmic include text-oriented measures, numeric-oriented measures and date-oriented measures 66.

Text oriented measures include for example, sound coding, string difference (text based), name and foreign name, which are a combination of sound coding, string and name equivalents. The sound coding uses sound coding algorithms to search for words, particularly names. Examples of existing sound coding applications include Metaphone and Soundex. Sound coding algorithms are useful to search for words that sound the same in one language, such as English or for mixed language words. String difference searches for exact matches, missing characters, similar looking characters and reversed characters. An English name measure combines sound coding, string difference and name equivalents. A foreign name measure combines sound coding, string difference and foreign name equivalents.

Numeric oriented measures include numeric difference, ranges (range-to-point, range-to-range, range difference), numeric combinations, range combinations and fuzzy measures. A fuzzy measure assigns a score that varies depending on how close to or far away from a particular value is to a specific value sought.

Date-oriented measures include date-to-range, date difference and date combination.

The weighting among attributes 73 determines the relative weight to be given to each parent/child object in a search where there are multiple children within a parent object. For example, a parent category suspect may contain as child categories or attributes the suspect's height, weight and hair color. The user may want to give the child category height, more importance (or weight) than suspect's weight and hair color. The user can specify the importance of the height category by given it an importance of, for example, 50% and may choose to give the suspect's weight and hair color an importance of 25% each respectively. The weighting will then be used to influence the combined score for suspect when the individual closeness scores for height, weight and hair color are combined to form one overall score for the suspect.

The scoring method 72 is used to score how similar or dissimilar each child category is for each document entry in the source database to be searched. The scoring is done on source data that has been organized into bands of data (called data bands) according to the categories to be searched. Scoring is the process of assigning a value to each entry in a data band according to the search criteria as delineated in the schema or query request from the user. The resulting score or number provides an indication of the closeness of the particular entry in a data band to the search criteria. The score is typically a number in a range of possible values, for example −1 to +1 or the like. Normally, the lowest number (in this example −1) indicates a minimum score, which may be considered very dissimilar. The maximum number usually indicates a very similar entry (in this example +1), while numbers in between represent varying degrees of similarity or dissimilarity. Other ranges of values are possible.

Figure 12A:
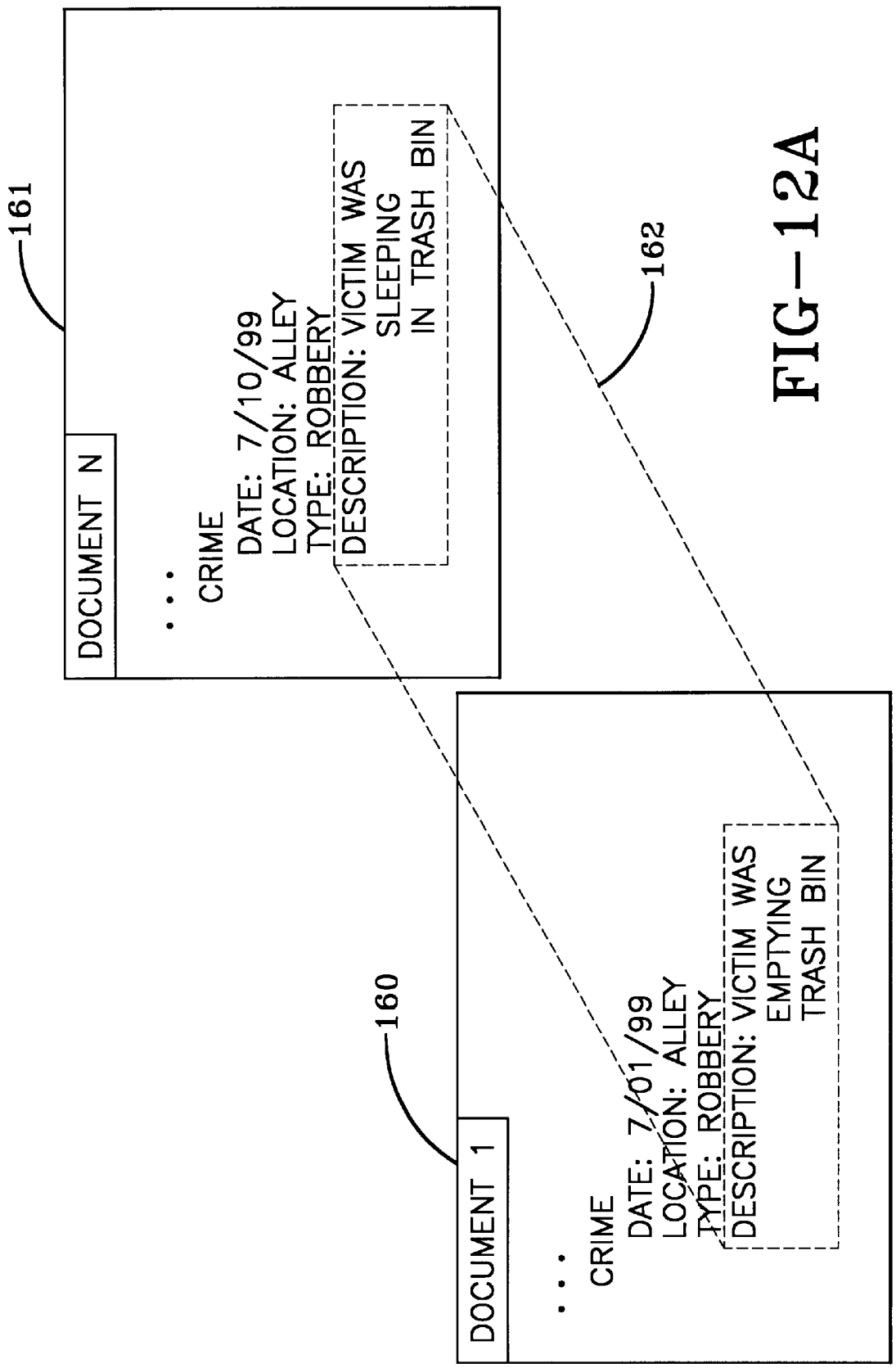
FIG. 12a is a conceptual view of a data band.
Figure 12B:
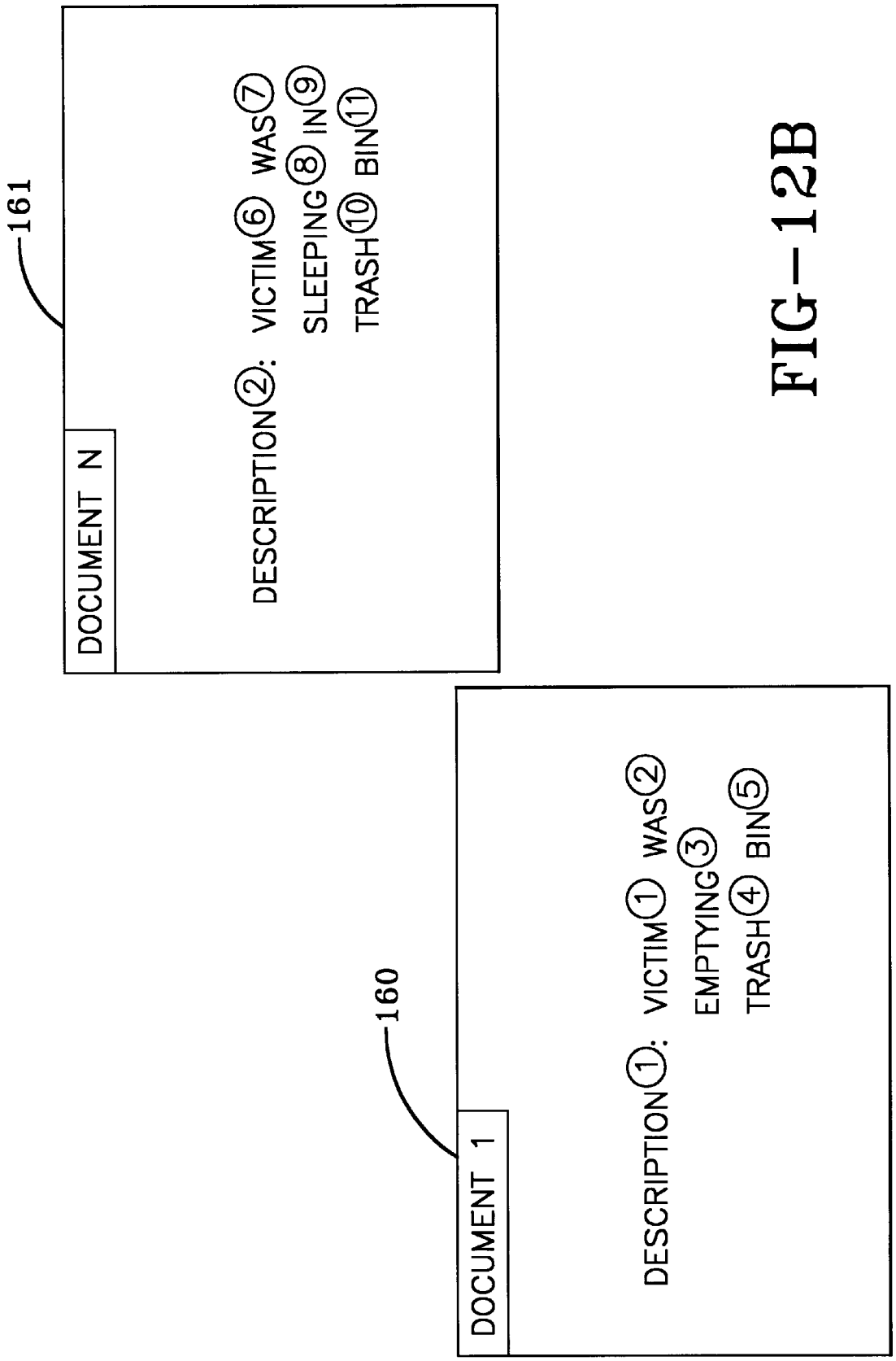
FIG. 12b shows the assignment of relative identifiers to parent and child categories in a set of documents.
Figure 12C:
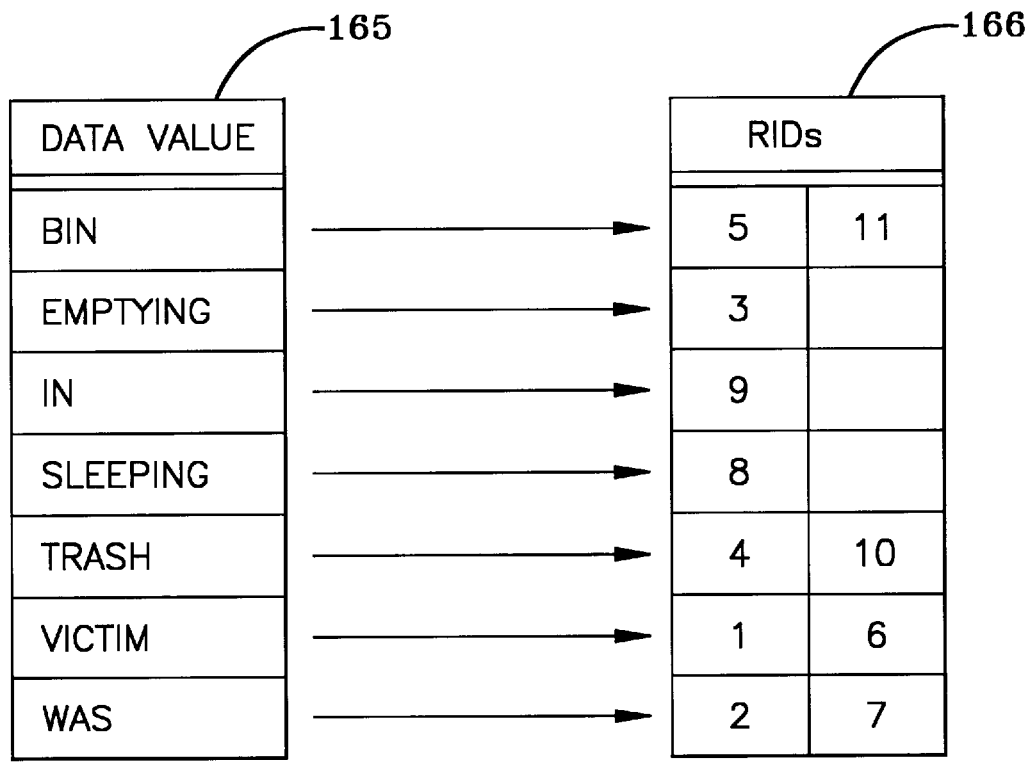
FIG. 12c shows data values stored only once and each occurrence of a particular value is assigned a RID.
Figure 12D:
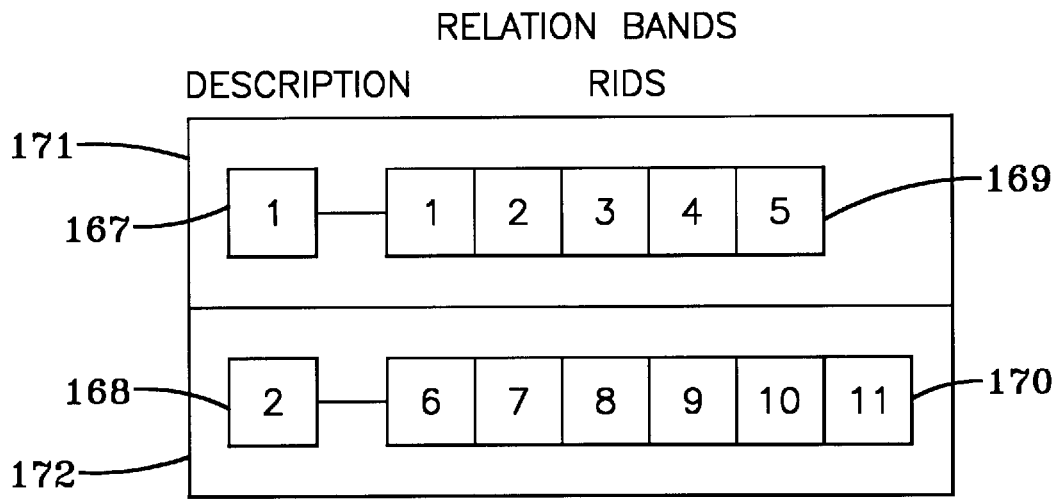
FIG. 12d shows an example of relation bands that are created using the RIDs of FIG. 12b.

FIG. 12a is a conceptual view of a data band. A data band represents all items in a particular category that exist in the database or document to be searched. Documents 1 through n (160–161) are documents that are imported into the system for later searching. Each document 160–161 may contain a number of parent and child objects or categories. In this example, a parent category is Crime, which contains the child, objects of Date, Location, Type and Description. The data band for description 162 contains all the documents that contain a description. FIG. 12b shows the assignment of relative identifiers (RIDs) to parent and child categories in a set of documents. Each occurrence of a particular element or value of the description category within each document is assigned a RID. When the data bands are populated, the data may be tokenized, which means it may be partitioned into smaller pieces to be processed more efficiently. Various methods can be used to partition the data. Tokenizing algorithms can implement the partitioning methods. A type of tokenizing is shown here for the description category where the text is partitioned. Turning now to FIG. 12c, each data value 165 used within the particular context is stored only once and each occurrence of a particular value is assigned a RID 166. The values 165 may be sorted, indexed or transformed in some other way, for example they may be case insensitive. The RIDS 166 may also be sorted to simplify lookup and increase locality. FIG. 12d shows an example of relation bands 171–172 that are created using the RIDS from FIG. 12b. The relation band establishes connections between parent/child objects or categories. In this example, it ties particular word occurrences to the descriptions in which they appear. The score-summing algorithm then processes relation bands. The Description from Document 1 (167) is represented by parent RID 1 and the description from Document 2 is represented by parent RID 2 (168). The RIDs 1 through 5 (169) are related to the Document Description 1 in which they are contained (167). The RIDs 6 through 11 are related to the Document Description 2 (168).

Turning back to FIG. 11, the parent score computing algorithm (choice or score summing algorithm) 74 is used for determining which score results will be selected for a particular category. In the scoring function discussed above, all entries within a data band established for that category are assigned a score of how similar or dissimilar the data is to the search criteria. All data bands that have more than one entry to search will then result in multiple scores. The parent score computing algorithm 74 then takes the score selected for each category and combines the scores (using the parent score computing algorithm and weighting selected by the user or the default weighting) into each parent category to arrive at an overall score for the highest level parent category. This process of selecting the score results and combining the results for the child categories into their parent categories is sometimes called rolling up the scores or a rollup. The parent score computing algorithm 74 determines the selection and combination of multiple scores when more than one score is available within a particular category for multiple entries of the same category within same document. The parent score computing algorithm may include single best, greedy sum, overall sum, greedy minimum, overall minimum and overall maximum 78 algorithms. Other types of algorithms for combining the scores may also be used.

The other items of interest 75 include but are not limited to specifying another database to cross search, the maximum number of scores to return for an object or category and the types and content of the results reported to the user 79.

Figure 13:
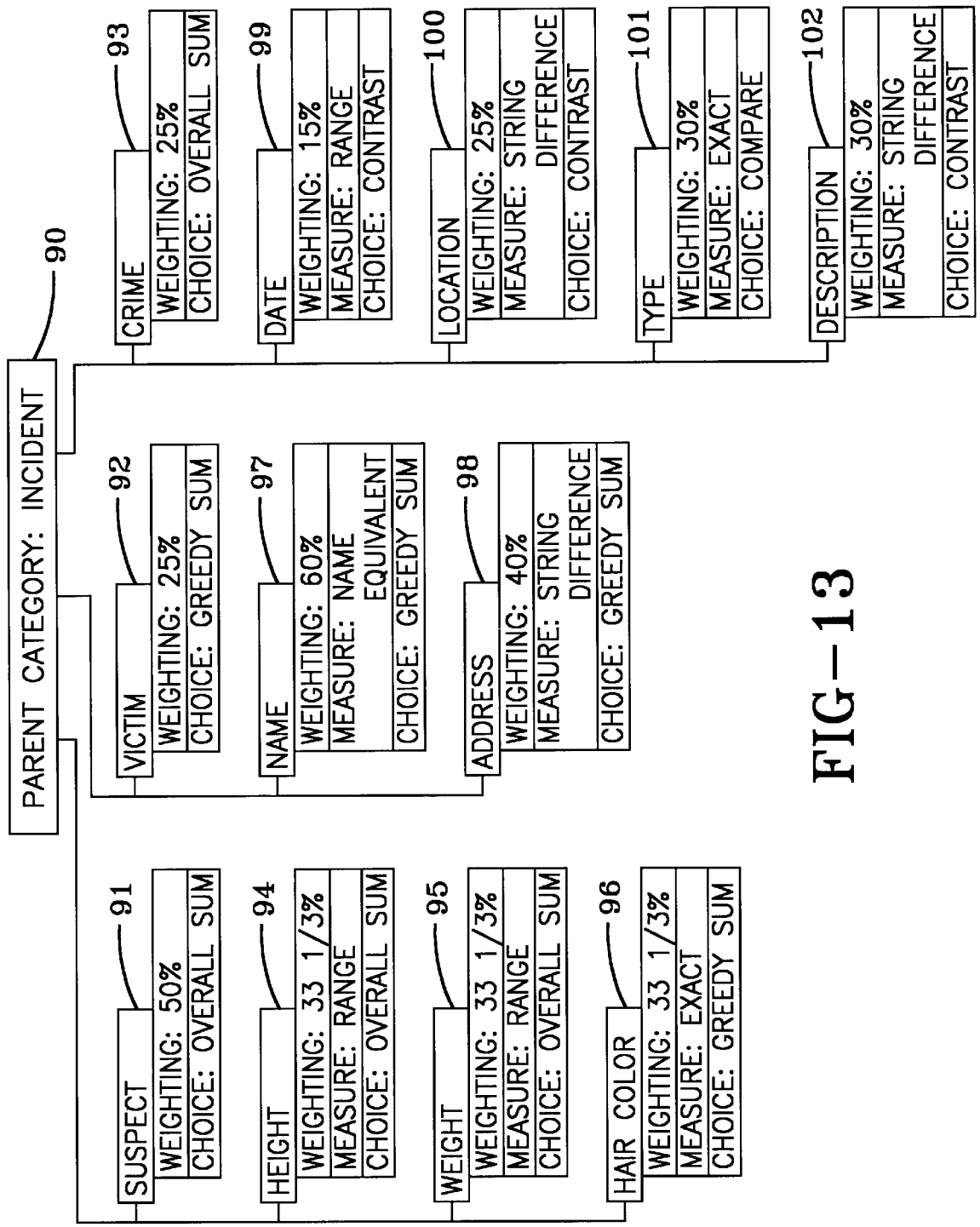
FIG. 13 is an example of the schema generation process

FIG. 13 is an example of the schema generation process in which the user models the problem domain. In this example, the parent category is called an incident 90. The parent object category incident 90 has three child objects or categories: suspect 91, victim 92, and crime 93. The user specifies the importance or weighting to be given to the child categories 91–93. In this case, suspect 91 is given weighting of 50%, victim 92 is given weighting of 25% and crime is given weighting of 25%. This means that finding a match for suspect 91 is more important when scoring similarities/contrasts within the suspect, victim and crime level one category. A parent score computing algorithm is also specified for each child category. The parent category of suspect 91 contains three child objects or categories height 94, weight 95 and hair color 96. The parent category of victim 92 contains two object categories name 97 and address 98. The parent category of crime 93 contains four object categories date 99, location 100, type 101 and description 102. Each child category 94–102 contains user-specified weighting, a scoring method (called a measure) and a parent score computing algorithm.

Figure 14:
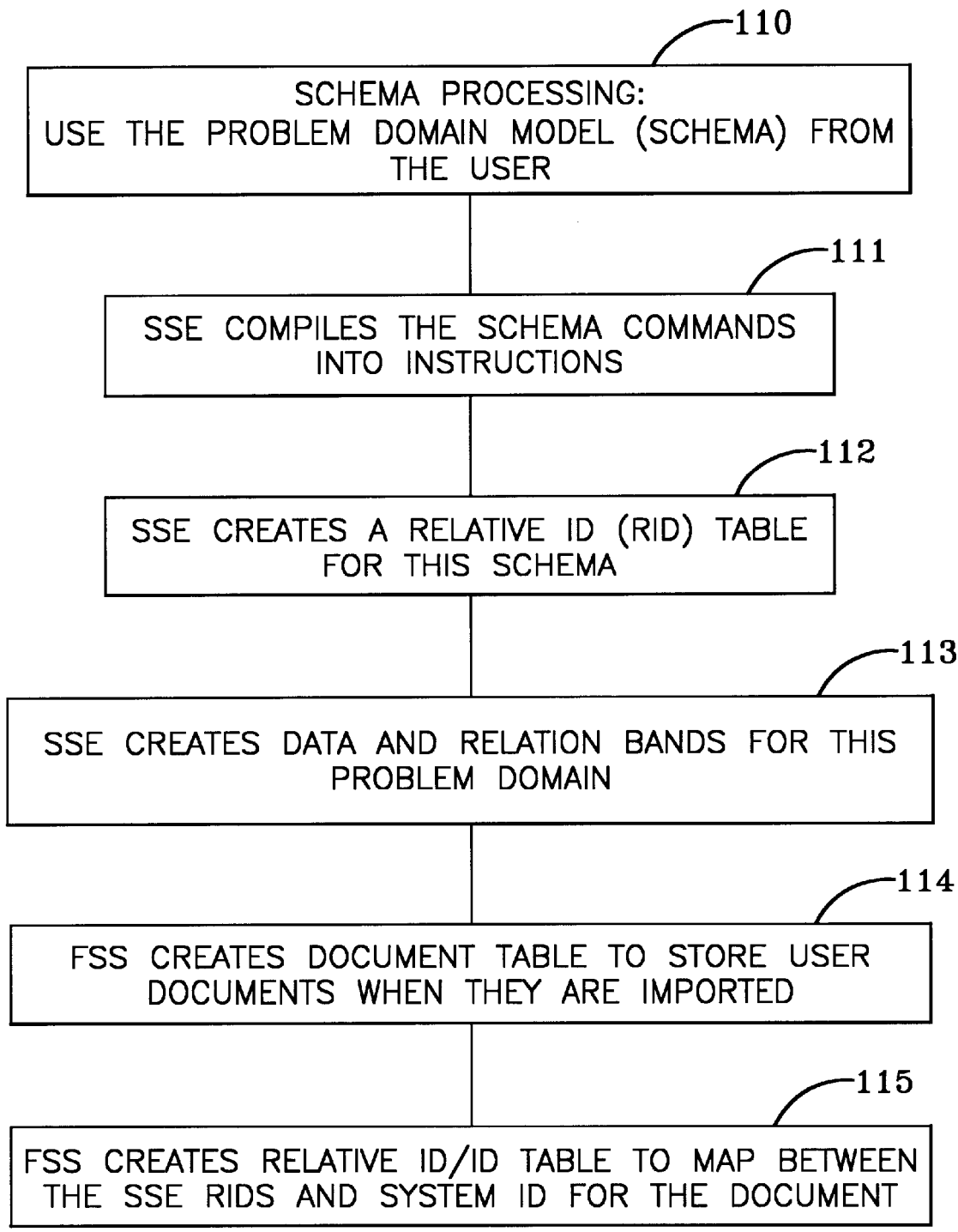
FIG. 14 is a flowchart of the schema processing.

FIG. 14 is a flowchart of the schema processing. The user generated problem domain model, as represented by the schema, is sent to the SSE server 110. This can occur through a gateway as shown in FIG. 7 or may be sent directly from the client in a non-networked configuration as shown in FIG. 8. In the stand-alone configuration as shown in FIG. 6, the schema function may reside in the same workstation/computer as the SSE function. The SSE compiles the commands into instructions using the SSE compiler 111 (51, FIG. 9). The SSE creates a relative identifier (RID) table for the problem domain as represented by the schema 112. The SSE creates indexing (data and relational bands) for the problem domain 113. The file storage and services (FSS) function creates a document table to store user documents 114. FSS creates a relative identifier/identifier table to map between the SSE RIDs, which will be assigned to each document and the system identifiers 115, where the system identifier is a primary document key used by the user and the system (other than the SSE) to identify documents to be searched 115.

Figure 15A:
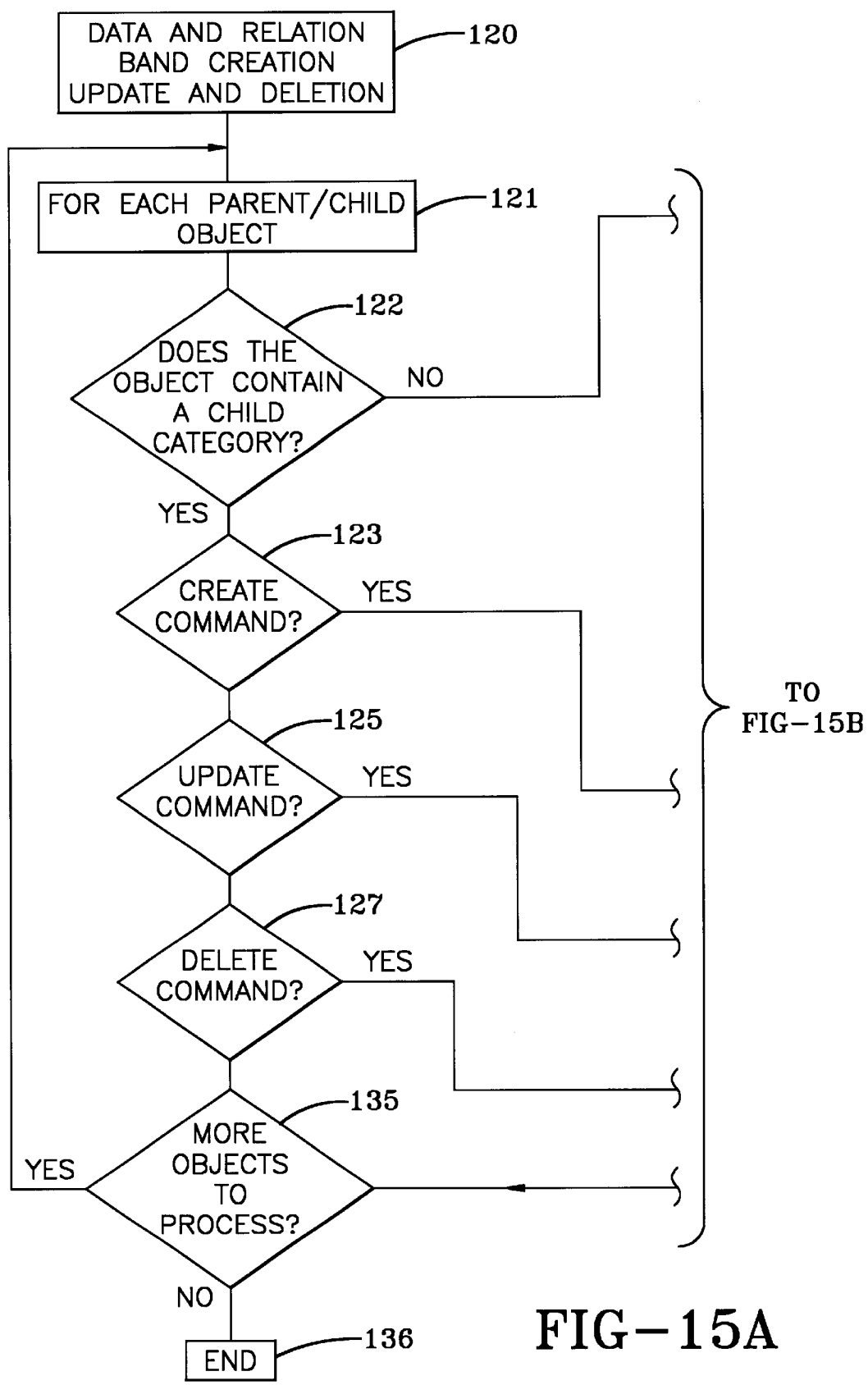
FIG. 15 is a flowchart of the data and relation band creation, update and deletion process.
Figure 15B:
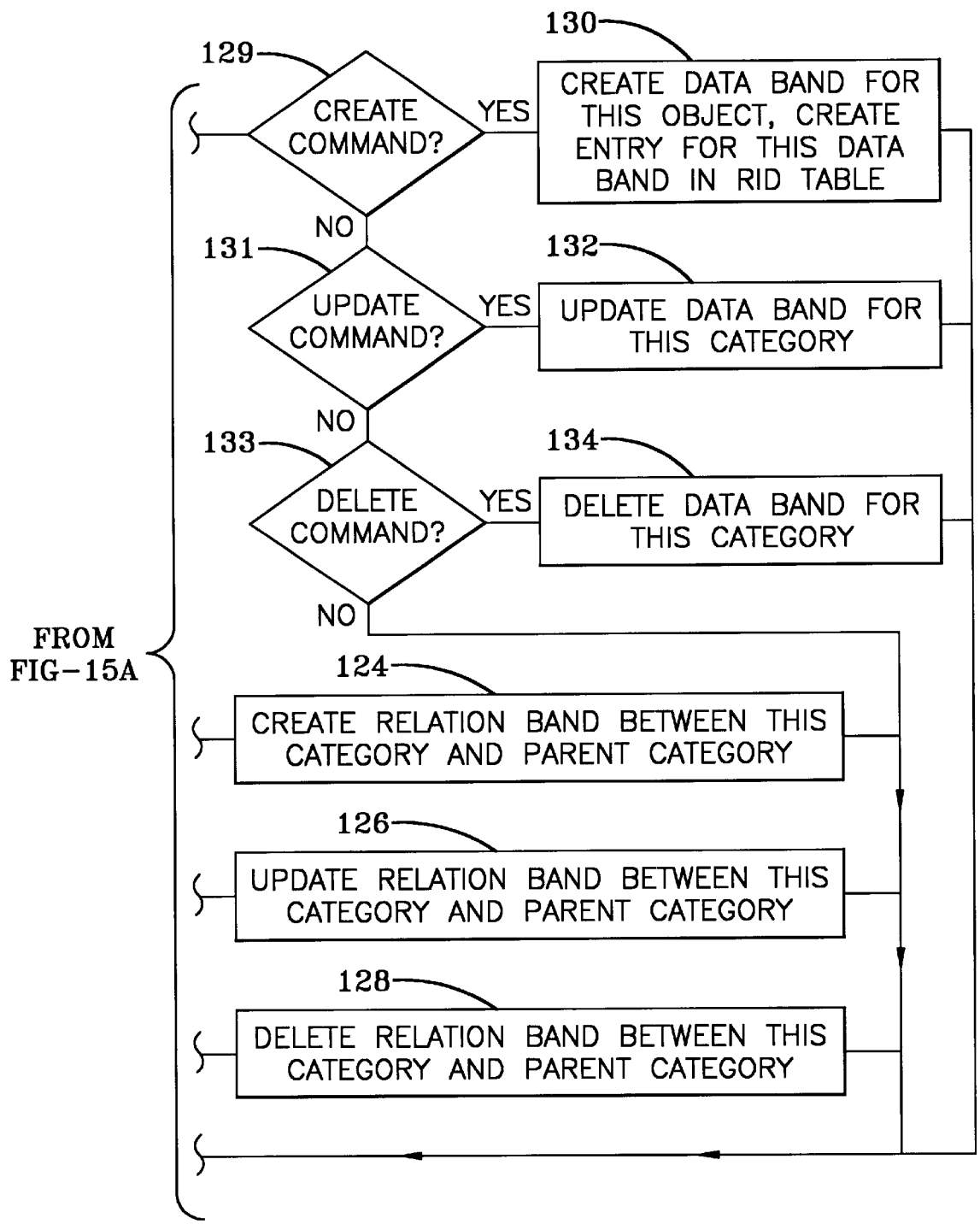

FIG. 15 is a flowchart of the data and relation band creation, update and deletion process 120. For each parent/child object 121, if the current category contains one or more child categories 122 and the schema's relation band command type is create 123 (indicating that a new relation band is to be created), the relation band between this category and its parent is created 124. If the schema's relation band command type is update 125, an existing relation band is updated for between the patent and child category 126. If the schema's relation band command type is delete 127, an existing relation band between a parent and child category is deleted 128. If the current category does not contain a child object 122 (meaning that the category is at the lowest possible level), then data bands are created. If the schema's command type is create 129, a data band is created 130. If the schema's command type is update 131, an existing data band is updated 132. If the schema's command type is delete 133, an existing data band is deleted 134. If there are more objects to process 135, then processing continues at step 121. Otherwise, processing ends 136.

Figure 16:
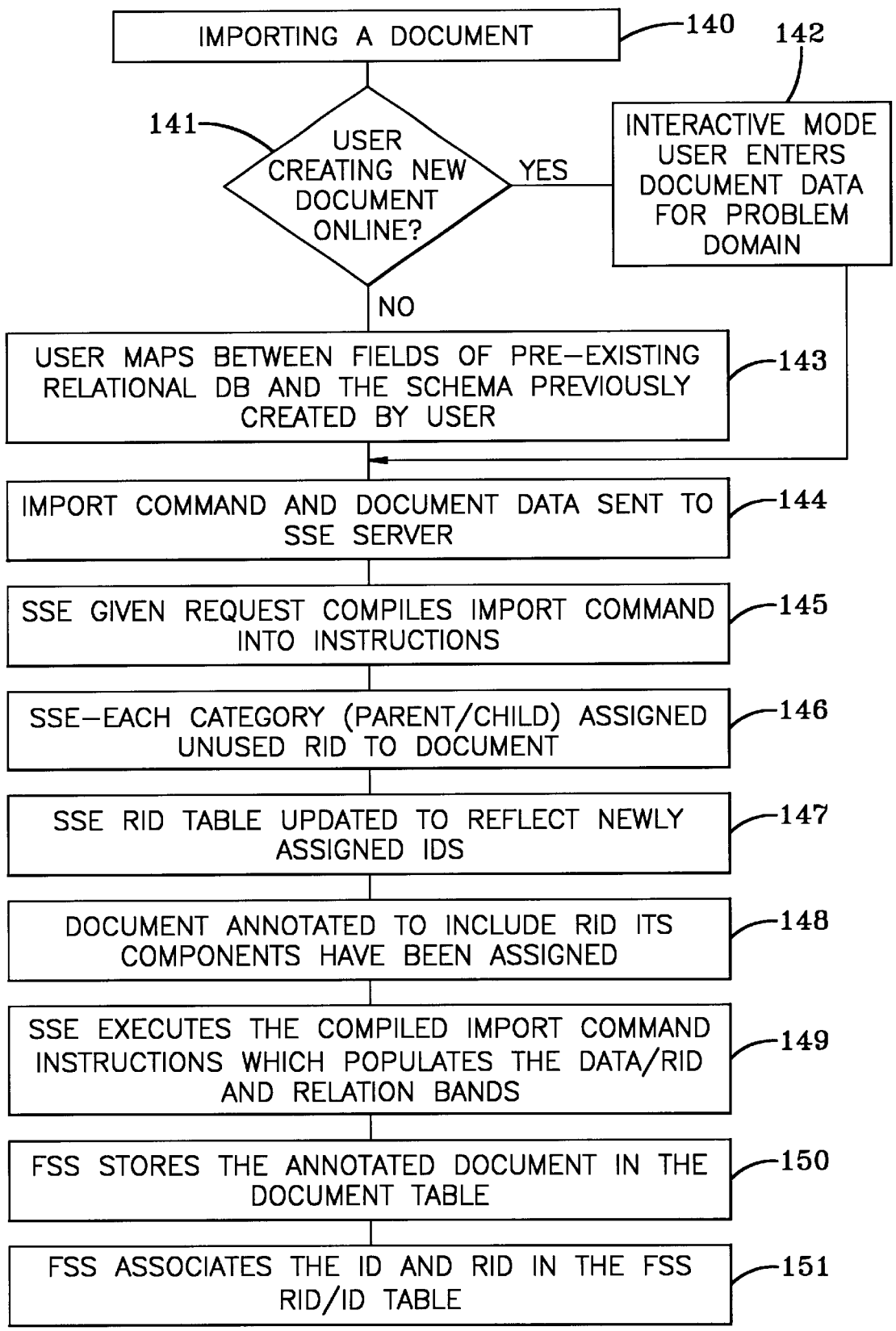
FIG. 16 is a flowchart of importing a document.

FIG. 16 is a flowchart of importing a document 140. After the data and relation bands have been created (as shown in FIG. 15) as part of the processing of the schema, the user may then import the documents to be searched using the schema. Alternatively, the user may create the document on-line 141 via a user-interface. An interactive mode with the user allows the user to enter document data for the problem domain as specified in the query 142. If an existing document, normally stored in a database is to be search, the user maps between the files of the preexisting document stored in a relational or object oriented database and the problem domain hierarchy previously modeled by the user 143 (as shown in FIGS. 10 and 14). In either case the import command and document data is sent to the SSE server 144. The SSE query request compiler (51, FIG. 9) compiles the import command into instructions 145. Each object is assigned an unused RID 146. The SSE RID table is updated to reflect newly assigned RIDs. 147. The imported document itself is annotated to include the RID its components have been assigned 148. The SSE virtual machine (52, FIG. 9) executes the compiled import command instructions which populates the data bands and relation bands 149 that were created during the schema processing (shown in FIG. 10). The file storage and services (FSS) function stores the annotated document in the document table 150 (41, FIG. 8). The FSS associates the document ID and RID in the FSS RID/ID table 151 (42, FIG. 8).

Figure 17:
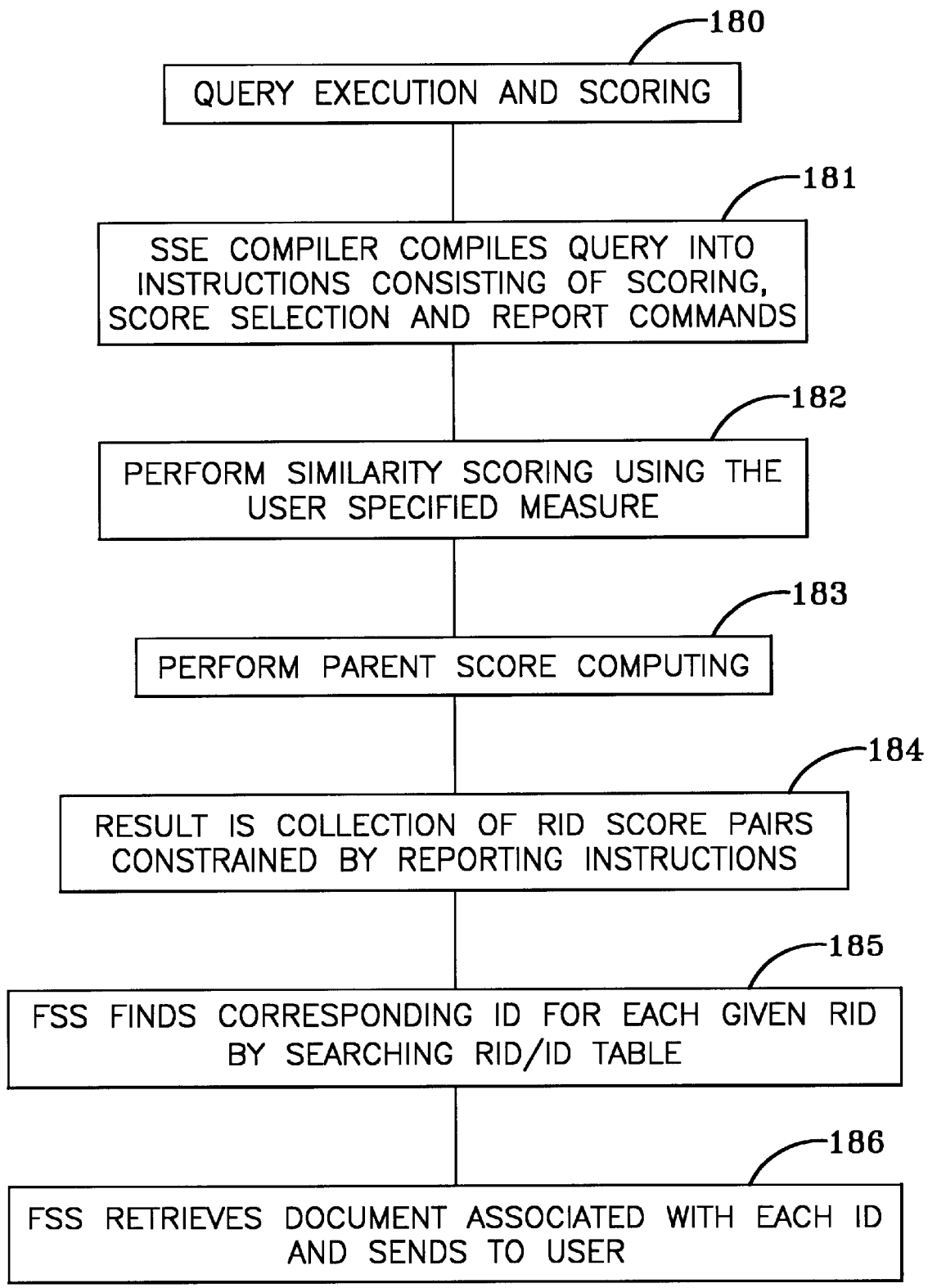
FIG. 17 is a flowchart of the query execution and scoring.

FIG. 17 is a flowchart of the query execution and scoring 180. A query is entered by the user and represents the actual search criteria. The SSE compiler 181 (51, FIG. 9) compiles the query into instructions where the instructions consist of scoring, parent score computing algorithm (score summing) and report commands 181. The SSE execution and scoring function (52, FIG. 9) performs similarity scoring 182 and computes the parent score 183 resulting in collections of RID score pairs constrained by reporting instructions 184. The FSS finds the corresponding ID for each given RID by searching the RID/ID table 185. The FSS retrieves the document associated with each ID and sends the retrieved documents to the user 186.

Figure 18B:
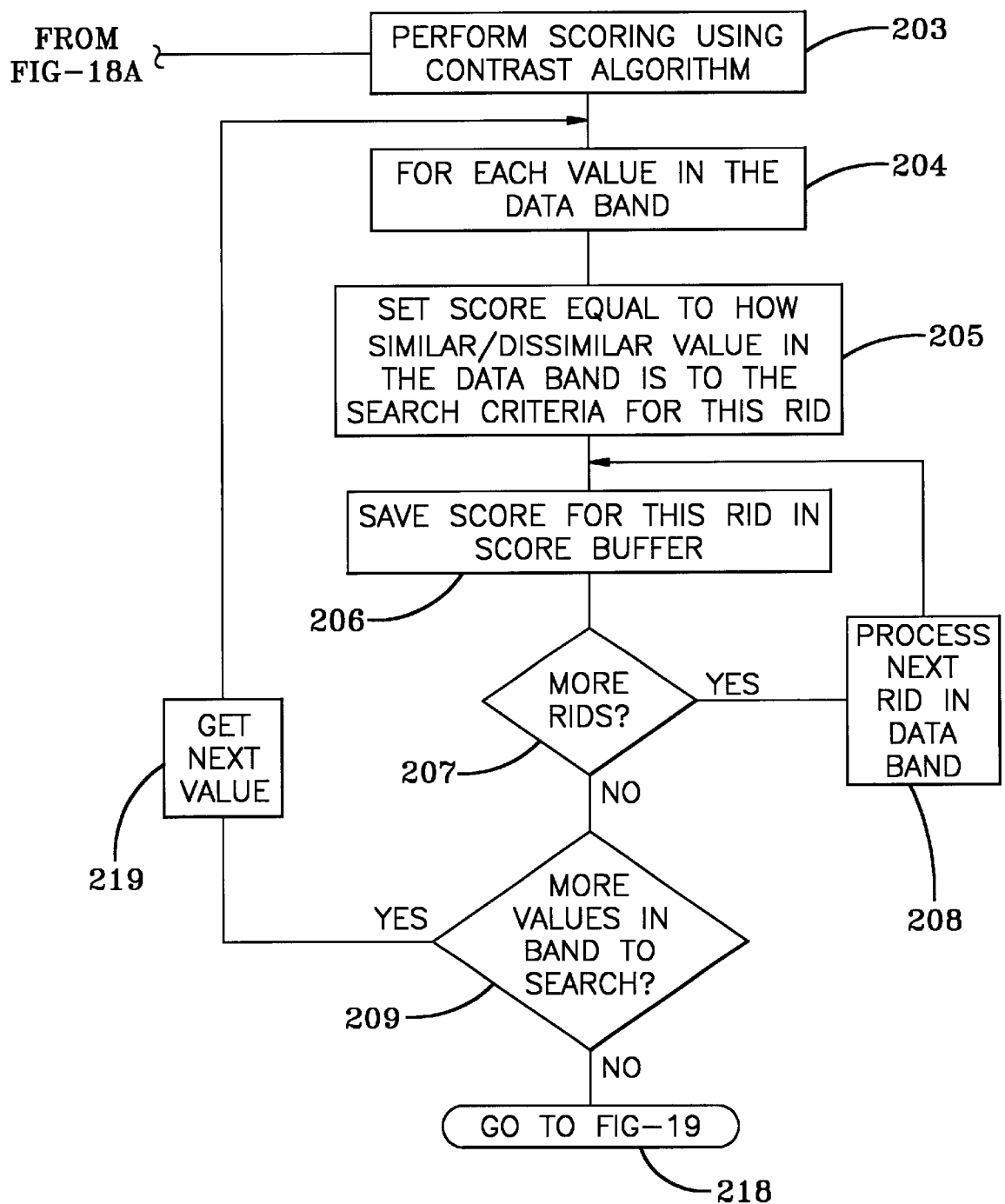
FIG. 18 is a flowchart of the similarity scoring process.

FIG. 18 is a flowchart of the similarity scoring process 200. For a user specific scoring method and weighting in the schema 201, if the scoring method is algorithmic 202, scoring is to be performed using a contrast algorithm 203. For each value in the search criteria to be searched 204, the score is set to how similar or dissimilar the value for this entry (indicated by an RID) within the data band is to the search criteria 205. The resulting score for this RID is saved in a score buffer for this RID 206. If there are more entries in the data band (RIDs) to process 207, the next entry (RID) in the data band is processed 208 and steps 205 through 207 are repeated. If all entries in the data band (RIDs) have been processed 207 and there are more values to search 209, the next value to search for is obtained 219 and steps 204 through 209 are repeated. If there are no more values to search 209, processing continues in FIG. 19.

In FIG. 18, if the scoring method not algorithmic, and is instead a generator type scoring method 202, scoring is performed using a compare type search 210. For each value to search 211, if the value exists in the data band, a preselected score is saved in the score buffer for this RID 213. If there are more entries in the data band (RIDs) to process 214, the next entry (RID) in the data band is processed 215 and steps 213 and 214 are repeated. If there are no more entries in the data band (RIDs) to process 214 and there are more values to search 216, the next value to search for is obtained 217, and steps 211 through 216 are repeated. If there are no more values to search 216, processing continues in FIG. 19.

Figure 19:
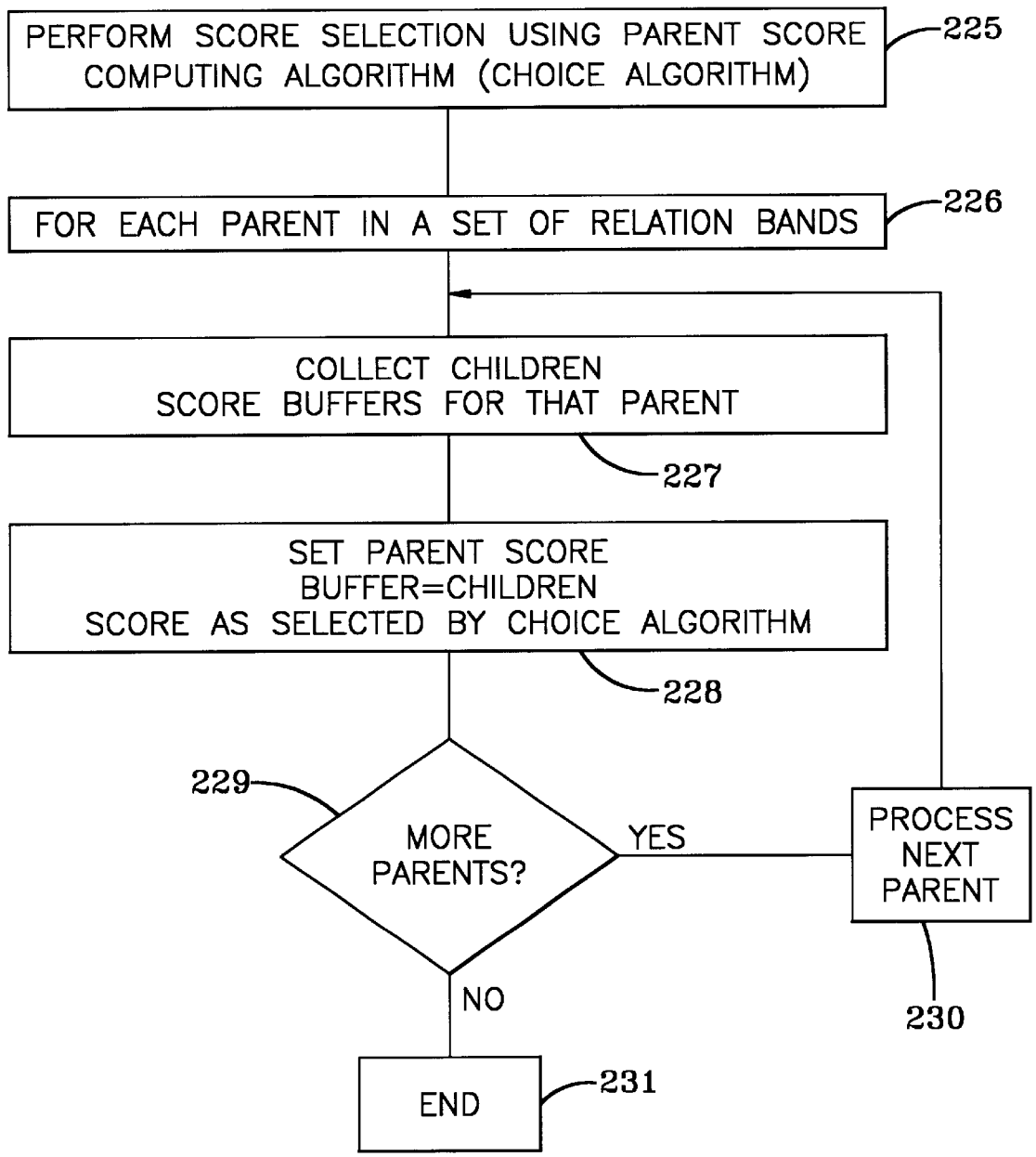
FIG. 19 is a flowchart of the process of score selection using the parent score computing algorithm.
Figure 20:
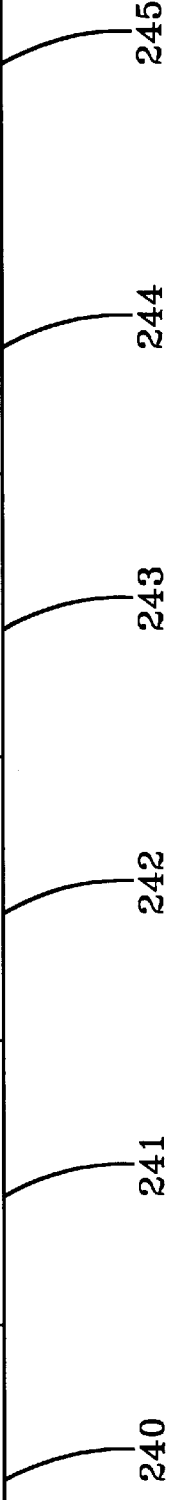
FIG. 20 is a table listing parent score computing algorithms and their respective processing.

FIG. 19 is a flowchart of the process of score selection using the parent score computing algorithm 225. For each parent in a set of relation bands 226, the children score buffers for that parent are collected together 227. The collection may be represented by a matrix. However, a physical matrix need not be used but may be logically constructed using the RIDs. The parent score buffer at a particular parent RID is computed from the children's score buffers as computed by the parent score computing algorithm 228 (choice algorithm or score summing algorithm). FIG. 20 is a table listing six parent score computing algorithms and their respective processing Other types of parent score computing algorithms may be used in step 228. If this is the highest level category, that is there are no more parent categories above 229, then processing ends 231. If there are more parents 229, that is, this parent category is a child category, then the next parent category is processed 230 and steps 227 through 229 are repeated.

FIG. 20 is a table of parent score computing algorithms that may be used in the score selection process. For all algorithms, it is assumed there are N number of children scores to process. In the single best algorithm 240, the parent score is set to the single largest score selected from the children score buffer. In the greedy sum algorithm 241 with a children's score buffer containing N number of scores, the largest score in the children score buffer is selected first, followed by the second largest until the Nth largest. The parent score is set to the sum of the results. In the overall sum algorithm 242, children scores are selected such that the sum of all scores is maximized. In the greedy minimum algorithm 243, the smallest score is selected first, followed by the next smallest until the N smallest is reached and the results are then summed. In the overall minimum algorithm 244, children scores are selected such that the sum of all scores is a minimum value. In the overall maximum algorithm 245, children scores are selected such that the sum of all scores is maximized and only the top score form this set is returned.

FIG. 21a shows an example of a database containing three incidents. The database example follows the schema specified in FIG. 13. The overall parent category/object is Incident, which contains the child/object categories of Suspect, Victim and Crime. The Suspect category contains the child/object categories of height, weight and hair color. Victim contain s child/object categories name and address. Crime contains child/object categories date, location, type and description. FIG. 21b is an example of search criteria from a schema initiated by user. For simplicity in this example, the schema indicates a search is to be done for one suspect with height, weight and hair color as specified in FIG. 21b. The schema could contain multiple search criteria; in addition to suspect, the schema could also contain a crime description associated with the suspect. Using the schema search criteria and working from the lowest child/object level, a separate data band is created for weight, height and hair color. A separate relation band is created for Incident/Suspect/Weight, Incident/Suspect/Height and Incident/Suspect/Hair Color. Another relation band is created for Incident/Suspect, Incident/Suspect and Incident/Suspect.

Turning back to FIG. 21a, the search criteria of FIG. 21a and the data and relation bands created as discussed above are used to assign relative identifiers (RIDs) to the entries in the database shown in FIG. 21a. Each Incident in the database is assigned a RID. A RID is dependent on a specific context and identifies only a particular item within that context. The actual RID number given to each entry in the database is arbitrary and any type of identification scheme such as a combination of numbers and letters may be used so long as the RID uniquely identifies the item within its context. In this example, the RIDs are unique identifiers with the contexts of Incident/Suspect/Height, Incident/Suspect/Weight and Incident/Suspect/Hair Color. For the purposes of this example, there are three incidents assigned RIDs 1 through 3. Each incident has a suspect, victim and crime. There are three suspects, assigned RIDs 1 through 3. RIDs would also be assigned to identify the victim and crime categories, but for the purposes of this example, we will discuss the suspect category only. RID 1 identifies height, weight and hair color within the data band for suspect 1. Height, weight and hair color within the data band for suspect 2, are identified by RID 2. Heights, weight hair color within the data band for suspect 3 are identified by RID 3. The assignment of the actual RID is arbitrary. For example, it is possible that each attribute for suspect 1 could have different RID numbers, not just RID 1.

Figures 21E, 21F, 21G:
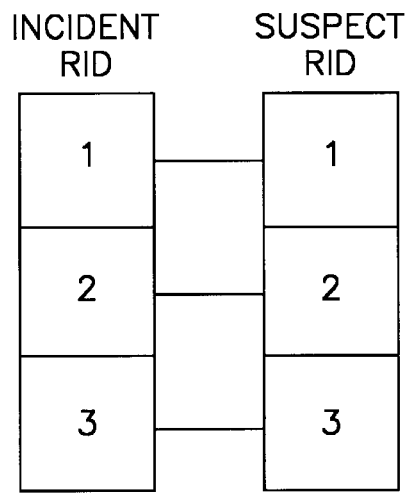
FIG. 21e shows the relation bands for Incident/Suspect.
FIG. 21f shows the commands for scoring methods and parent object scoring algorithms input by the user into the schema.
FIG. 21g shows the resulting similarity search scoring.

FIG. 21c shows the data bands created for Incident/Suspect/Height for the database entries of FIG. 21a. The height value of 6'0" appears in RID 1. The height value of 5'11" appears in RIDS 2 and 3. FIG. 21d shows the relation bands created for Suspect/Height. Each Height RID of FIG. 21c must be related to its parent category Suspect. RID 1 which contains the height value 6'0 is associated with Suspect 1, RID 2 is associated with suspect 2 and RID 3 is associated with Suspect 3. The Suspect category must be related to its parent category Incident. This is shown in FIG. 21e. Incident RID 1 is associated with Suspect RID 1, Incident RID 2 is associated with Suspect RID 2 and Incident RID 3 is associated with Suspect RID 3.

FIG. 21f shows the commands for scoring methods and parent object scorings input by the user into the schema. For height and weight, the schema specifies a numeric oriented measure which results in a contrast type search (similarities and dissimilarities are searched) within the range specified by the user. For hair color, the schema specifies an exact match, which results in a compare type search. A score will be determined for each value in the data band (FIG. 21c) based on the search criteria. The scores for each category must be saved in a score buffer and the score buffer are designated 1 through 3.

FIG. 21g shows the resulting scoring for the score buffers. Score buffers 1 through 3 correspond to the height, weight and hair color scores. Score buffer 1, RID 1 is given a score of 0.75 (75% match) because it is within the range of the search criteria of 5'11', but is not an exact match. Score buffer 1, RIDs 2 and 3 are given a score of 1.0 (100% match) because they exactly match the search criteria. Similar results are shown for score buffers 2 and 3.

Turning now to FIG. 21h the commands for summing scores are shown. Score summing uses the parent score computing algorithm specified by the user in the schema.

The parent score computing algorithm takes the score determined for each category and combines or rolls up these scores into each parent category to arrive at an overall score for the highest level parent category. The weighting given to each category of height, weight and suspect is specified as equal, but any type of weighting is possible and can be specified by the user in the creation of the schema. The results in score buffer 1, which contains the height scores are first summed using the overall sum algorithm and the result for Suspect/Height is saved in score buffer 4 RID 1 (FIG. 21g). The results in score buffer 2, which contains the weight scores are first summed using the overall sum algorithm and the result for Incident/Suspect/Weight is saved in score buffer 4 RID 2 (FIG. 21g). The results in score buffer 3, which contains the hair color scores are summed using the greedy sum algorithm and the results for Suspect/Hair Color is saved in score buffer 4 RID 3 (FIG. 21g). The results of all three score buffers must now be combined into parent category of Incident/Suspect. In this case, since each incident contains one suspect, score buffer 5 which holds the results for the Suspect for RIDs 1 through 3 has the same values as score buffer 4. The results in FIG. 21g indicate that Incident1/Suspect1 (FIG. 21a) is probably the most similar to the search criteria based on the measure and parent score computing algorithm in the schema, while Incident2/Supsect2 is next similar followed by Incident3/Suspect3.

Figure 21J:
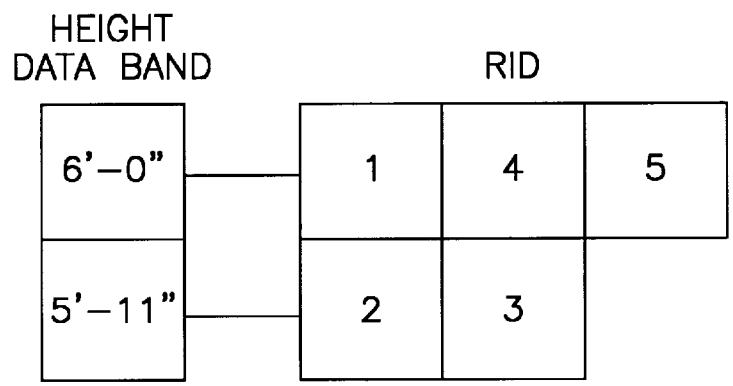
FIG. 21j shows the data bands created for Incident/Suspect/Height for the combined database of FIG. 21a and FIG. 21i.
Figure 21K:
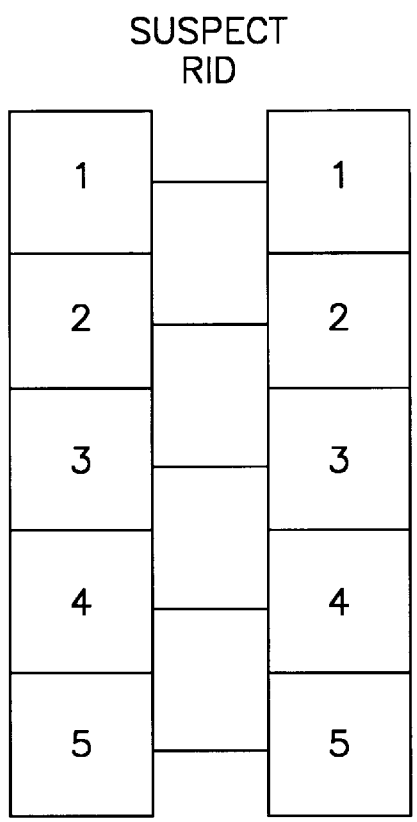
FIG. 21k shows the relation bands for Incident/Suspect/Height for the combined database of FIG. 21a and FIG. 21i.
Figures 21L, 21M:
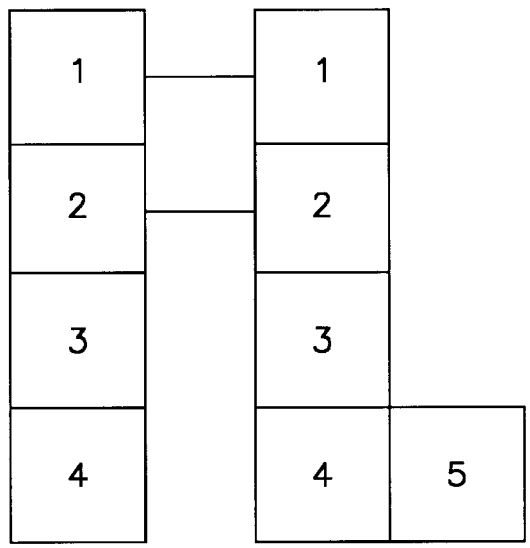
FIG. 21l shows the relation band for Incident/Suspect for the combined database of FIG. 21a and FIG. 21i.
FIG. 21m shows the resulting similarity search scores.

FIG. 21i contains additional database entries to be added to the database of FIG. 21a. In FIG. 21i, one Incident (Incident RID4) having two Suspects (Incident RID4 and RID5) are added. FIG. 21j shows the data bands created for Incident/Suspect/Height for the combined database of FIG. 21a and FIG. 21i. FIG. 21k shows the relation bands for Incident/Suspect/Height for the combined database of FIG. 21a and FIG. 21i. FIG. 21l shows the relation band for Incident/Suspect for the combined database of FIG. 21a and FIG. 21i. Incident 4 has two suspects, categories 4 and 5. FIG. 21m shows the resulting score buffer 4 (similar to FIG. 21g) with the additions of scores for RID 4 and RID 5. In this case, since incident 4 contains two suspects RID 4 and RID 5 (FIG. 21i), a choice must be made between Incident 4, Suspects 4 and 5. Since the parent score computing algorithm being used for score buffer 5 is single best, RID 5 in score buffer 4 is chosen because it is more similar than RID4 in score buffer 4 and is saved in score buffer 5.

When a similarity search is executed by the similarity search engine, each document in the hierarchical database is scored against the search criteria submitted with the search according to the scoring method selected by the user (or if none is selected, the default scoring method that is part of the schema). As shown above in FIG. 21a, each document is broken down into parent/child objects and organized into data bands and relation bands according to the search criteria. The execution, scoring and parent score computing algorithm (score summing) are performed in a virtual machine that controls the execution of the commands compiled by the SSE compiler. The commands are added to a work queue in the virtual machine, along with commands generated from other search requests. Using the examples in FIG. 21a through m, the data bands of FIG. 21c would require scoring against the search criteria using the scoring methods specified by the user (FIG. 21f). Because the data is organized into data bands, a command to score each value in the data band is executed by the virtual machine. Each value in the data band can be scored at the same time. For example, in FIG. 21j the values for 6'0 in the data band can be grouped and executed together to optimize system performance by reducing the number of times a band has to be loaded. In FIG. 21f, the scoring for the height, weight and hair color RIDs can be executed in parallel. The data bands then need to be score computed according to the parent score computing algorithm selected (FIG. 21h). Parent score computing (also called score summing) is the process that involves propagating the score for a particular child to its parent (FIGS. 21g and 21m). Every similarity search executed involves one or more parent score computing (score summing) operations. The number of parent score computing (score summing) operations is a function of the number of values in the data band and the number of parent/child categories. There are interdependencies between the various scoring and parent score computing (score summing) operations that control the order in which they are permitted to execute. A parent score computing (score summing) operation may not execute until all of its child operations have completed, however, sibling parent score computing (score summing) operations may execute independently of one another. For example, as shown in FIG. 21f, the parent score computing (score summing) of height, weight and hair color into the suspect parent category must occur before summing the resulting score for incident parent category.

In a highly concurrent single or multiprocessor system, multiple similarity searches that require scoring and parent score computing (score summing) may be executing or waiting to execute simultaneously. The scoring and parent score computing (score summing) can be can be coalesced by the using the context of the relation band that the scores represent. By coalescing, it is meant that concurrent operations that occur within the same data band for scoring and within the same relation bands for parent score computing (score summing) are combined into a single operation for execution by the execution and scoring virtual machine within the similarity search engine regardless of the measure, weighting and parent score computing algorithm. For example, if there are one hundred searches that are executing simultaneously, and each search involves a thread (or set of processing steps) for performing a parent score computing (score summing) operation within the relation band context of "Incident/Suspect/Name". Without coalescing, one hundred threads (or sets of processing step) of execution would have to occur where each thread would iterate of the "Incident/Suspect/Name" band to perform the parent score computing (score summing) process. With coalescing based on band context, the one hundred threads can be iterated once over the band. Although both sequential and parallel processing require the same number of child and parent score buffers as input, the number of iterations is reduced and the number of times it exists in memory is also reduced.

Figure 22:
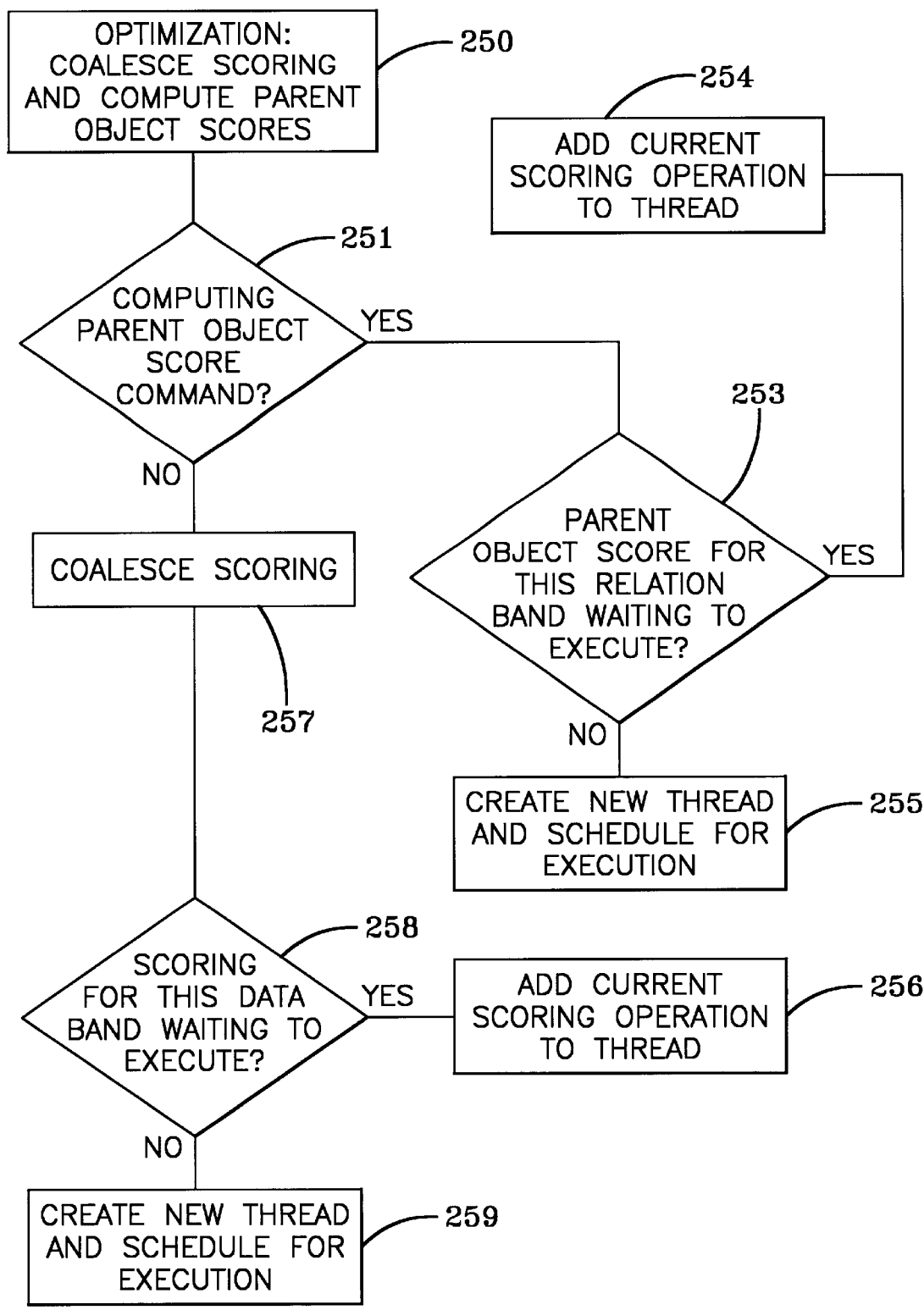
FIG. 22 is a flowchart of the optimizing scoring and computing parent object score processes.

FIG. 22 is a flowchart of the optimizing scoring and computing parent object score process 250 by coalescing the present command with a command waiting to be executed. If the command is a computing parent object score request (score summing) 251 and a computing parent object score request score for this relation band is waiting to execute 253, the current command operation is added to the existing thread for this context (coalesced) if resources permit (for example, score buffers are available). A global table exists which identifies the parent object threads for each relation band context waiting to be executed. If a compute parent object score entry for this relation band context exists in the global table 253, then the current parent object score operation is coalesced or added to this thread 254. Execution of the threads by the SSE VM will then occur at the same time if resources permit. If a compute parent object score entry for this context does not exist in the global table 253, then a new thread is created and scheduled for execution 255. If the operation is for scoring 257, then a check is made in a global scoring table to determine if a scoring operation for this data band is waiting to execute 258. If so, the current scoring operation is added to the thread 256 if there are resources available. Execution of the scoring threads will then occur at the same time if resources permit. If a scoring entry does not exist in the global table for this data band 258, then a new thread is created and scheduled for execution 259.

Figure 23:
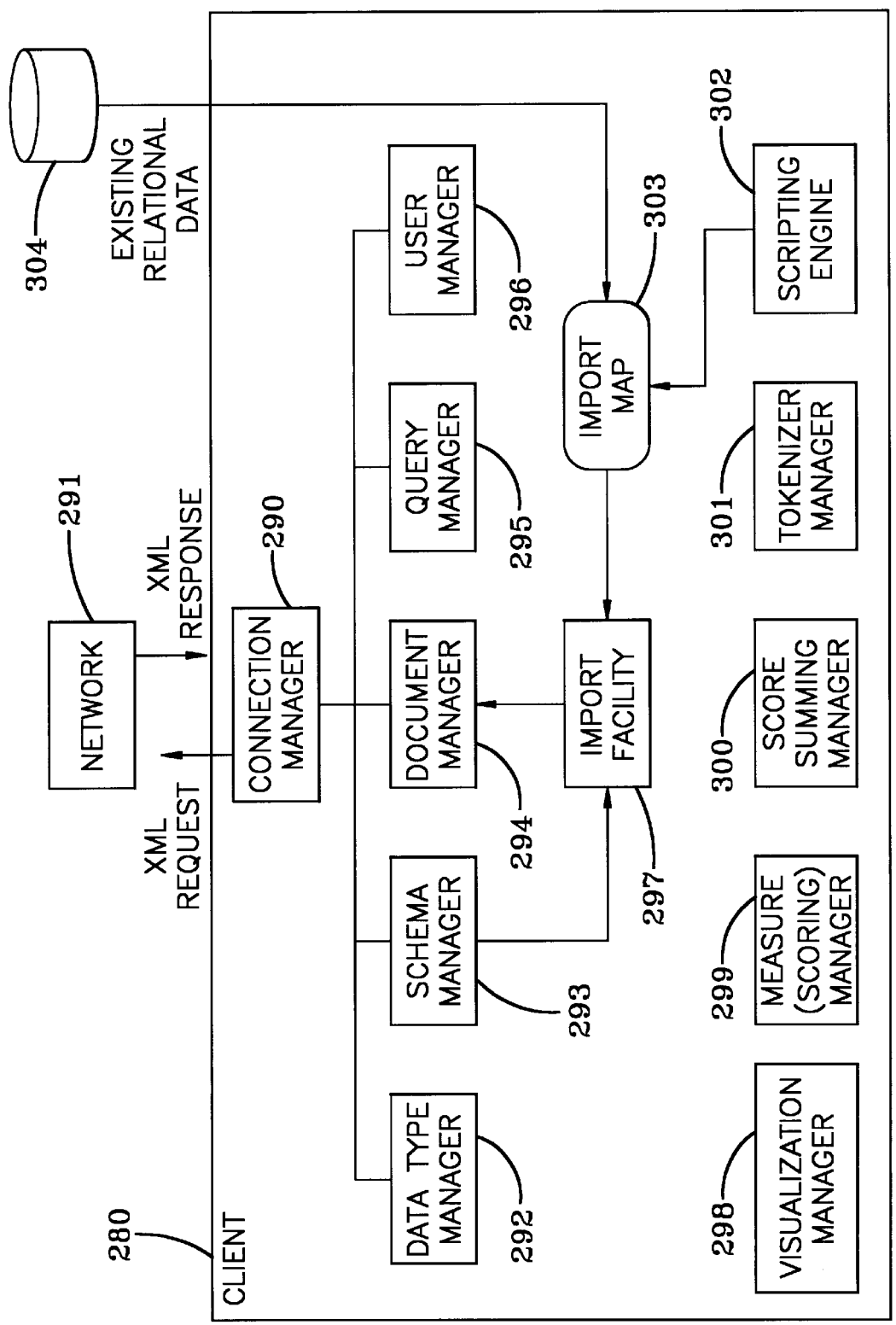
FIG. 23 is a diagram of the client functions of the similarity search engine system in a networked client-server computer configuration.

FIG. 23 is a diagram of the client functions of the similarity search engine computer system in a networked client-server computer configuration. The client query, user administration, data base import and schema creation functions exist within the client. As shown in FIGS. 1 and 5, the client may exist on a single computer server or may be spread across multiple computer platforms. Likewise, the client may exist in a standalone configuration as shown in FIG. 6. The client contains a connection manager 290. The connection manager 290 manages the interface to the similarity search engine server. In the networked client-server computer configuration shown in FIG. 20, the connection manager 290 maintains a logical connection to the network or gateway 291. If the hierarchical database language XML is used, as shown in FIGS. 1 and 5, the connection manager sends XML request and receives XML responses, maintains the current user state information, maintains a connection with the network and authenticates all calls to the client. The data type manager 292 acts as a repository for data type information. It retrieves stored data types and saves data types to disk and maintains a list of all available data types. It allows the user to print data types. The schema manager 293 allows the user to build and save schemas and to load existing schemas stored on disk. The document manager 294 acts as a central point for saving and retrieving documents. It is connected to an import facility function 297 which allows the documents to be imported from an existing relational database 304 using an import map 303 and a scripting engine 302. The scripting engine 302 processes scripts that allow for the cleanup of the database by transforming the text and fields of the data. For example, the database may have the text entry November, and for ease of searching, it may be desirable to convert the month to its number designation 11. The scripting engine can process any type of script to cleanup database data. The query manager 295 acts as the central point for issuing queries to the similarity search engine server. It generates the commands necessary to issue a similarity and document compare query. The scoring method manager 299 allows the user to choose scoring methods, and build and save scoring methods when creating a schema. The score-summing manager 300 allows parent score computing (score summing) results to be saved within the client function. These results may also be saved in the similarity search engine server. The tokenizer manager 301 provides a central point of reference for tokenizers within the system that break the text down into their semantically relevant parts.

Figure 24:
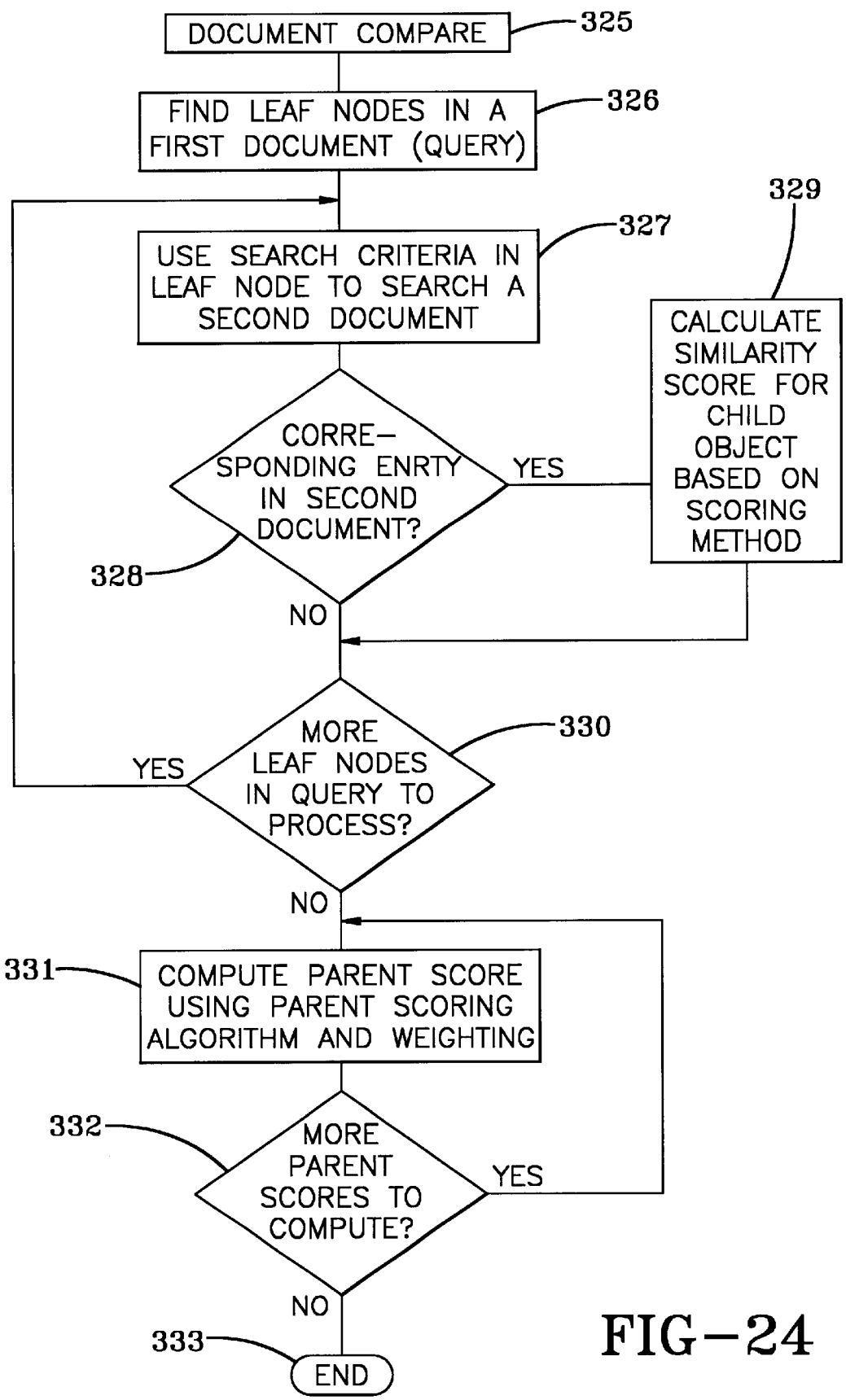
FIG. 24 is a flowchart of the document comparison function.

FIG. 24 is a flowchart of the document comparison function 325. A first document in a hierarchical language may be annotated with a scoring method or algorithm (measure), weighting and parent scoring algorithm, the annotated first document becoming a query which is used to search a second document. The query is stored in a hierarchical language format having parent and child objects. A child object that has no children, is called a leaf node. The document compare function "walks through" the query and finds leaf nodes in the query that contain the search criteria 326. The query (or alternatively the schema associated with the document) may also specify a scoring method or algorithm (called a measure) to be used for scoring similarity, the weighting to be used for child categories within a parent and a parent scoring algorithm to be used to compute parent scores for their children's scores. A second document to be searched is also in a hierarchical language format containing parent and child objects. Using the search criteria in the query leaf node, the second document is examined to determine if the search criteria in the leaf node is found within an object in the document 327. If a corresponding entry in the second document is found 328, a similarity score for the child object is calculated based on the specified scoring method or algorithm 329. If there are more leaf nodes in the query to process 330, the process is repeated for all leaf nodes (steps 327 through 329). If there are no more leaf nodes in the query to process 330, parent scores are computed using the parent scoring algorithm 331 and the process is repeated 332 until a single overall parent score is computed and processing ends 333. Alternatively, the order of the processing may be different, for example, all the leaf node scores do not have to be processed before parent scores are computed. Some leaf nodes may be processed and their parent scores computed and then more leaf node processed and their parent scores computed, etc. The order of processing is not important so long as a parent's child objects are scored before the parent score is computed. In any case, all the children scores at all levels are annotated and saved and may be viewed by the user along with the single overall parent score for the highest parent object called a leaf root. Any weighting specified in the query is also used by the parent scoring algorithm to determine the weight to be given to the individual child scores when they are used to compute their parent scores.

FIG. 25 shows an example of a graphical user interface displaying the results of a document comparison similarity search. It shows the side by side display of the document comparison search result for two documents. The document labeled anchor 340 is the first document in a hierarchical language that is annotated with a scoring method or algorithm (measure), weighting and parent scoring algorithm, the annotated first document becoming a query which is used to search a second document. The score 341 represents the similarity search results as specified by the scoring method for between the objects of the first and second document.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A computer implemented method for detecting and scoring similarities between documents in a source database and a search criteria comprising:
    a. using a hierarchy of parent and child categories to be searched in a schema created by a user, linking each child category with its parent category by assigning an index to connect each child category with its parent category and assigning an entry in a data structure called a data band to each child category that contains no children categories;
    b. converting source database documents into hierarchical database documents having parent and child objects with data values organized using the hierarchy of parent and child categories to be searched;
    c. for each child object, calculating a child object score that is a quantitative measurement of the similarity between the hierarchical database documents and the search criteria; and
    d. computing a parent object score from its child object scores.

2. The method of claim 1 wherein converting the source data base further comprises populating each data band with data values from each child object that contain no children, each data value being assigned a relative identifier.

3. The method of claim 2, wherein calculating a child object score further comprises for each data value in the data band assigning a number for the score that represents how similar and dissimilar the value is to the search criteria.

4. The method of claim 3, wherein the score is saved in a score buffer.

5. The method of claim 3 wherein the score buffers are indexed by the relative identifier for the data value.

6. The method of claim 3 wherein assigning a number for the score is selected from the group consisting of an algorithmic scoring method and a non-algorithmic scoring method.

7. The method of claim 3 wherein assigning a number for the score comprises if the scoring is algorithmic, using a scoring algorithm to assign the score number.

8. The method of claim 3 wherein assigning a number for the score comprises if the scoring is not algorithmic and if the data value in the data band matches the search criteria, assigning as the score number a value that represents a match between the data value and the search criteria.

9. The method of claim 3 wherein the parent object score is computed using a parent score computing algorithm.

10. The method of claim 9 wherein the parent score computing algorithm comprises:
    a. identifying the child scores and the relationship between the parent and child objects;
    b. using the relationship, identifying a parent score to be computed;
    c. computing the value of the parent score from the child scores using the parent score computing algorithm; and
    d. repeating steps b and c until all parent scores have been computed.

11. The method of claim 10 wherein the parent score computing algorithm is selected from the group consisting of single best, greedy sum, overall sum, greedy minimum, overall minimum and overall maximum.

12. The method of claim 3 wherein calculating the scoring comprises comparing the search criteria represented in a markup software language to a markup software language indexed by the data bands.

13. The method of claim 1 further comprising a schema specifying:
    a. the hierarchy of parent and child categories to be searched;
    b. a scoring method for calculating the score for each child object;
    c. a weighting for each child object when there are multiple child objects within the parent object; and
    d. a parent score computing algorithm for computing the parent object score from the child object scores.

14. The method of claim 13 wherein the schema is defined by a user using a graphical user interface.

15. The method of claim 13 wherein the schema used is previously defined and stored in a database.

16. The method of claim 1 further wherein the search criteria is contained in a query generated by a user.

17. The method of claim 1 wherein the source database is a relational database.

18. The method of claim 1 wherein the hierarchical database documents are stored in a markup software language.

19. The method of claim 1 wherein the search criteria is represented in a markup software language and the hierarchical database documents are represented in a markup software language.

20. The method of claim 1 further comprising a schema specifying a scoring method for calculating the score for each child object.

21. The method of claim 1 further comprising a schema specifying a weighting for each child object when there are multiple child objects within a parent object.

22. The method of claim 1 further comprising a schema specifying a parent score computing algorithm for computing a parent object score from the child object scores.

23. Computer-readable media having computer-executable instructions for performing the method as recited in claim 1.

24. A computer implemented method for detecting and scoring similarities between documents in a source database and a search criteria comprising:
    a. using a schema created by a user containing a hierarchy of parent and child categories for searching, linking each child category with its parent category by assigning an index to connect each child category with its parent category and assigning an entry in a data structure called a data band to each child category that contains no children categories;
    b. converting each document within the source database into a hierarchical database having a data structure of parent and child objects, and an indexing structure linking each child object to its parent object;
    c. for each child object in the hierarchical database, populating the data structure with the data values from each child object and linking the child object to its parent object using the indexing structure; and d. using a query that contains the similarity search criteria:
  i. for each data value in each child object, calculating a data value score that is a quantitative measurement of the similarity between the data value and the search criteria of the query;
  ii. determining a child object score using the data value scores;
  iii. computing a parent object score from its child object scores.

25. The method of claim 24 wherein:
a. the data structure contains an entry for each child object to be searched, each entry containing the data values from each child object and each data value in the child object having a relative identifier; and
b. the indexing structure linking each child object to its parent object comprises an index that links each child object with its parent object.

26. The method of claim 25 wherein:
a. collecting entries for each child object for a category to be searched in a data band which contains the data values from each child object, the data values having the relative identifiers; and
b. linking each child object with its parent object using a relation band.

27. The method of claim 26 wherein calculating a data value score comprises calculating a score for each data value in the data band and saving the score in a score buffer.

28. The method of claim 26 wherein determining a score for each child object comprises, for each data value in the data band, using a scoring algorithm to assign a number that represents how similar and dissimilar the value is to the search criteria and saving the score in a score buffer.

29. The method of claim 28 wherein the score buffers are indexed by the relative identifier for the data value.

30. The method of claim 26 wherein calculating a score for each child object comprises, for each value in the data band that is assigned a relative identifier:
  a. if the scoring is algorithmic, assigning as the score a number using a scoring algorithm and continuing processing in step c below;
  b. if the scoring is not algorithmic and if the value in the data band matches the search criteria, assigning as the score a value that represents a match; and
  c. saving the score in a child score buffer indexed by the relative identifier.

31. The method of claim 30 wherein the computing of the parent object score comprises:
  a. identifying the child score buffers and their relation bands;
  b. using the relation bands, identifying a parent score to be computed and stored in a parent score buffer;
  c. using a parent score computing algorithm, computing the value of the parent score from the child score buffers and storing it in a parent score buffer; and
  d. repeating steps b and c until all parent scores have been computed.

32. The method of claim 30 wherein the computing of the parent object score value comprises:
  a. based on the search criteria in the query, identifying the child score buffers and their relation bands;
  b. using the relation bands, identifying a parent score to be computed and stored in a parent score buffer; and
  c. using a parent computing algorithm and a score weighting algorithm, computing the value of the parent score from the child score buffers.

33. The method of claim 31 wherein the parent score computing algorithm is selected from the group consisting of single best, greedy sum, overall sum, greedy minimum, overall minimum and overall maximum.

34. The method of claim 31 wherein the computing of the parent score value further comprises using a weighting function to assign weights to the child score buffer and using those assigned weights in the parent score computing algorithm.

35. The method of claim 26 wherein the schema further comprises:
  a. a scoring method for calculating the score for each child object;
  b. a weighting for each child object when there are multiple child objects within a parent object; and
  c. a parent score computing algorithm for computing parent object score from the child object scores.

36. The method of claim 35 wherein the schema further comprises specifying a maximum number of scores to return.

37. The method of claim 36 wherein the schema further comprises returning the highest score values.

38. The method of claim 36 wherein the schema further comprises returning lowest score values.

39. The method of claim 35 wherein the schema further comprises a type and content of a result report generated after the computing of the parent scores has been completed.

40. The method of claim 39 wherein the results report is displayed to the user on a client computer having a graphical user interface.

41. The method of claim 35 wherein the scoring method is algorithmic.

42. The method of claim 35 wherein the scoring method generates search criteria values and compares the data values to the search criteria values and if a match occurs, a number is saved in a score buffer for the data value that represents a match.

43. The method of claim 26 further comprising a global table for inserting scoring and parent object computing compiled commands waiting to be executed.

44. The method of claim 43 further comprising optimizing scoring by:
  a. when a scoring command is about to be executed by a virtual machine, checking the global table to determine if a preexisting scoring command waiting to be executed uses a same data band as the scoring command and if so, adding the scoring command to a thread for the preexisting scoring command; and
  b. executing the thread.

45. The method of claim 43 further comprising optimizing parent score computing by:
  a. when a computing a parent object score command about to be executed, checking the global table to determine if a preexisting command waiting to be executed uses the same relation band as the computing a parent object score command and if so, adding the computing the parent object command score to a thread for the preexisting command; and
  b. executing the thread.

46. The method of claim 24 wherein the source database is a relational database.

47. The method of claim 20 wherein the source database contains a document created by the user using a graphical user interface.

48. The method of claim 24 wherein calculating the data value score and the child object score uses a scoring algorithm.

49. The method of claim 48 wherein the scoring algorithm assigns a numerical value to quantify the similarity and dissimilarity between the query and the child object.

50. The method of claim 49 wherein the scoring algorithm is a text oriented algorithm.

51. The method of claim 49 wherein the scoring algorithm is a numeric oriented algorithm.

52. The method of claim 49 wherein the scoring algorithm is a date oriented algorithm.

53. The method of claim 24 wherein calculating the data value score comprises:
   a. generating search criteria values; and
   b. comparing the data values to the search criteria values and if the data value matches the search criteria values, assigning a score that is a number that represents degree of similarity.

54. The method of claim 53 wherein generating the search criteria values further comprises:
   a. predetermining a score for each search criteria value; and
   b. if the data value matches the search criteria values, assigning that predetermined score to represent the degree of similarity of the data value to the search criteria.

55. The method of claim 24 wherein the schema is defined by a user using a graphical user interface.

56. The method of claim 55 further comprising saving the schema defined by the user in a database.

57. The method of claim 24 wherein the schema is retrieved from a database containing stored schemas.

58. The method of claim 24 wherein the query is dynamically defined by a user.

59. The method of claim 24 wherein the query is retrieved from a database of stored queries.

60. The method of claim 24 further comprising performing cross database searching using the same schema and query, repeating claim 20, steps a through d for each of N number of source databases and allowing a user to view a result for each database.

61. The method of claim 60 further comprising displaying the search criteria and the results for the N source databases on a user's computer graphical user interface.

62. The method of claim 24 further comprising:
   a. compiling schema commands by a similarity search engine;
   b. creating a relative identification table for the schema;
   c. creating data bands to represent the data structure and relation bands to represent the indexing structure;
   d. creating a document table to store user documents when they are imported into the system to be searched;
   e. assigning relative identifiers to data values in the data bands;
   f. assigning relative identifiers to the parent objects and storing the relative identifiers for the parent objects in the relation bands; and
   g. creating a relative identification and system identification table to store the mapping between the relative identifiers assigned to the data values in the data bands and a system identifier for the document.

63. The method of claim 62 wherein the data and relation bands comprise:
   a. creating a data band for each child category and creating an entry for each data band in a relative identification table for each parent and child object;
   b. for each parent category, creating an index called a relation band that links the child object to their parent object by creating a relation band entry in a relative identification table for parent and child objects;
   c. continuing steps a and b until data bands are created for all child objects and relation bands are created for all parent objects.

64. The method of claim 24 wherein the source database contains at least one document created by the user.

65. The method of claim 24 wherein the hierarchical database is created by a user mapping between the schema and data in a preexisting source database.

66. The method of claim 65 wherein the source database is a relational database.

67. The method of claim 24 wherein the hierarchical database is stored in a markup software language.

68. The method of claim 67 wherein the markup language is Extensible Markup Language (XML).

69. The method of claim 67 wherein the markup language is Standard Generalized Markup Language (SGML).

70. The method of claim 24 wherein the similarity search criteria as specified by the user in the query is translated into a markup language.

71. The method of claim 24 wherein the scoring comprises comparing the search criteria in a markup language to the hierarchical database stored in a markup language.

72. The method of claim 24 further comprising reporting similarity search results to a user via a graphical user interface displayed on a user's client computer.

73. The method of claim 72 wherein the results are reported to the client computer using a markup language.

74. The method of claim 24 wherein the hierarchical database is created by a user entering data.

75. The method of claim 24 wherein additional categories are added to the schema.

76. The method of claim 24 wherein categories are deleted from the schema.

77. The method of claim 24 further comprising partitioning the data values into smaller pieces prior to populating the data bands.

78. The method of claim 77 wherein the partitioning is done using a tokenizing algorithm.

79. The method of claim 24 wherein the schema further comprises allowing the user to specify a data type for an object.

80. The method of claim 79 further comprising if the data type is assigned to the parent object, the child object inherits the data type assigned to the parent object.

81. The method of claim 80 further comprising allowing the user to add data types to a child object.

82. The method of claim 80 further comprising allowing the user to add and delete data types to the parent object.

83. Computer-readable media having computer-executable instructions for performing the method as recited in claim 24.

84. A system for detecting and scoring similarities between items in a source database and a search criteria comprising:
   a. at least one client computer having a graphical user interface for entering client commands including schemas, importing documents to be searched, and entering a similarity search query;
   b. a network interconnecting the client computer to a similarity search engine computer comprising:
      i. a search engine compiler for compiling client commands received from the client computer;
      ii. a virtual machine for executing the client commands;
      iii. a document comparison means for executing document comparison commands;

iv. a file storage and services function for processing document data and storing schemas, data types, document data and entries in a data structure called a data band assigned to child categories that contain no children categories; and c. a data storage device for storing search engine data, document data and relative identifiers.

85. A system for detecting and scoring similarities between items in a source database and a search criteria comprising:

a. a client computer for:
  i. defining a schema by a user containing a hierarchy of parent and child categories to be searched;
  ii. importing and translating the source database into a hierarchical database using the schema;
  iii. defining a query that contains similarity search criteria;
  iv. sending commands for steps i. through iii. to a similarity search engine computer;

b. a similarity search engine computer comprising:
  i. a compiler for compiling commands from the client computer;
  ii. a virtual machine for:
    1. organizing parent and child categories into a data structure and creating an indexing structure that links the child categories of the schema with its parent category;
    2. converting each document in the source database into a hierarchical database having parent and children objects corresponding to the schema defined hierarchy of parent and children categories;
    3. for each child object in the hierarchical database, populating the data structure with the data values and linking the child object to its parent object using the indexing structure; and
    4. using a query that contains the similarity search criteria:
      (a) calculating a data value score for each child object having a value in a range between a minimum score and a maximum score that is a quantitative measurement of the similarity between the query and the child object;
      (b) determining a child object score using the data value scores;
      (c) computing a parent object score from its child objects;
  iii. a document comparison means for executing document comparison commands;
  iv. a file storage and services function for
    1. creating a document table for storing hierarchical database documents when they are imported into the similarity search engine computer;
    2. creating a relative identification to system identification table to map between relative identifiers and primary keys in the hierarchical database; and c. a database for
  i. storing the document table and relative identifiers for the database documents;
  ii. storing data bands and relation bands;
  iii. storing a table of relative identifiers.

86. A computer implemented method for detecting and scoring similarities between documents comprising:

a. annotating a fist document in a hierarchical format with similarity measures, weights and a choice algorithm which becomes a query;

b. using the query having query leaf nodes containing search criteria that correspond to the categories to be searched;

c. using the search criteria in each query leaf node to search a second document in a hierarchical format having parent and child objects, wherein an entry is assigned in a data structure called a data band to each child category that contains no children categories;

d. if a child object corresponding to a query leaf node category is found in the second document, calculating a child object similarity score that is a quantitative measurement of the similarity between the child object and the search criteria in the leaf node and saving the child object score;

e. computing a parent object score from its children object scores using a parent object scoring algorithm; and f. repeating steps b through e until all query leaf nodes are processed.

87. The method of claim 86 wherein the similarity score for each child object is calculated by a scoring algorithm that assigns a numerical value to quantify the similarity and dissimilarity between the query and the child object in the second document.

88. The method of claim 86 wherein the similarity score for each child object is calculated by comparing the child object in the second document to the search criteria in the query and if a match is found, assigning a similarity score to the child object that is representative of a match.

89. The method of claim 86 further comprising in the computing the parent object score step, using a weighting specified by the user to influence the weight given to the child object scores when they are used by the parent object scoring algorithm to compute the parent score.

90. The method of claim 86 further comprising reporting the computed parent object score result to the user.

91. The method of claim 86 further comprising reporting the child object scores to the user.

92. The method of claim 86 further comprising calculating a child object similarity score comprises comparing the search criteria is represented in a markup software language to the second document represented in a markup software language.

93. A computer-readable medium containing instructions for detecting and scoring similarities between documents in a source database and a search criteria comprising:

a. using a hierarchy of parent and child categories to be searched in a schema created by a user, linking each child category with its parent category by assigning an index to connect each child category with its parent category and assigning an entry in a data structure called a data band to each child category that contains no children categories;

b. converting source database documents into hierarchical database documents having parent and child objects with data values organized using the hierarchy of parent and child categories to be searched; and c. using a query that contains the search criteria, for each child object, calculating a child object score that is a quantitative measurement of the similarity between the hierarchical database documents and the search criteria; and d. computing a parent object score from its child object scores.

* * * * *